US012760619B2

(12) United States Patent
Gunasekaran et al.

(10) Patent No.: US 12,760,619 B2
(45) Date of Patent: Oct. 13, 2026

(54) DEVICE AND METHOD OF EMPLOYING A MAGNETIC FIELD ANGLE SENSOR TO DETERMINE A HEALTH OF A SAFETY VALVE IN DOWNHOLE APPLICATIONS

(71) Applicant: Halliburton Energy Services, Inc., Houston, TX (US)

(72) Inventors: Mohan Gunasekaran, Al-Khobar (SA); David Allen Dockweiler, Singapore (SG); Michael Linley Fripp, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/983,686

(22) Filed: Dec. 17, 2024

(65) Prior Publication Data

US 2025/0207493 A1 Jun. 26, 2025

Related U.S. Application Data

(60) Provisional application No. 63/632,224, filed on Apr. 10, 2024, provisional application No. 63/616,026,
(Continued)

(51) Int. Cl.
*E21B 34/06* (2006.01)
*E21B 34/14* (2006.01)
(Continued)

(52) U.S. Cl.
CPC ............ *E21B 34/066* (2013.01); *E21B 34/14* (2013.01); *F16K 31/0675* (2013.01); *F16K 31/084* (2013.01); *E21B 2200/05* (2020.05)

(58) Field of Classification Search
CPC ........ E21B 34/066; E21B 34/06; E21B 34/14; E21B 47/00; E21B 47/092;
(Continued)

(56) References Cited

U.S. PATENT DOCUMENTS 6,352,118 B1 3/2002 Dickson et al.
11,248,441 B2 2/2022 Vick, Jr. et al.
(Continued)

FOREIGN PATENT DOCUMENTS

WO WO-2016073006 A1 * 5/2016 ............ E21B 21/10
WO 2020041056 A1 2/2020
WO WO-2020117187 A1 * 6/2020 ............ E21B 34/06

*Primary Examiner* — James G Sayre
(74) *Attorney, Agent, or Firm* — Scott Richardson; Parker Justiss, P.C.

(57) ABSTRACT

Provided is a safety valve, a well system, and a method. The safety valve, in one aspect, includes an outer housing, a bore flow management actuator disposed within the outer housing, and a valve closure mechanism disposed within the outer housing. The safety valve, in accordance with this aspect, further includes one or more permanent magnets coupled to one of a movable feature of the safety valve or a fixed feature of the safety valve, and one or more magnetic field angle sensors coupled to an other of the fixed feature of the safety valve or the movable feature of the safety valve and positioned proximate the one or more permanent magnets, the one or more magnetic field angle sensors configured to sense a movement of the movable feature to determine a health of the safety valve.

24 Claims, 20 Drawing Sheets

Related U.S. Application Data filed on Dec. 29, 2023, provisional application No. 63/614,231, filed on Dec. 22, 2023, provisional application No. 63/614,266, filed on Dec. 22, 2023.

(51) Int. Cl.
*F16K 31/06* (2006.01)
*F16K 31/08* (2006.01)

(58) Field of Classification Search
CPC .. E21B 2200/04; E21B 2200/05; E21B 34/10; F16K 31/0675; G01B 7/30; G01D 5/16
See application file for complete search history.

(56) References Cited

U.S. PATENT DOCUMENTS

| | | | | |
|---|---|---|---|---|
| 11,761,304 | B1 * | 9/2023 | Agbo | E21B 34/14 166/321 |
| 2004/0045714 | A1 | 3/2004 | McGavern, III et al. | |
| 2005/0056414 | A1 | 3/2005 | Dennistoun et al. | |
| 2006/0157240 | A1 * | 7/2006 | Shaw | E21B 47/09 166/66 |
| 2007/0102164 | A1 | 5/2007 | Mackenzie | |
| 2010/0154530 | A1 | 6/2010 | Oddie | |
| 2011/0127993 | A1 | 6/2011 | Pearce | |
| 2011/0240299 | A1 * | 10/2011 | Vick, Jr. | E21B 34/10 137/511 |
| 2012/0032099 | A1 | 2/2012 | Vick, Jr. | |
| 2013/0220624 | A1 | 8/2013 | Hill, Jr. et al. | |
| 2013/0341034 | A1 * | 12/2013 | Biddick | F16K 31/06 166/373 |
| 2016/0115782 | A1 | 4/2016 | Martinez | |
| 2017/0247960 | A1 | 8/2017 | Kyle et al. | |
| 2020/0392822 | A1 | 12/2020 | Sengul et al. | |
| 2021/0254431 | A1 * | 8/2021 | Prost | E21B 34/14 |
| 2022/0127948 | A1 * | 4/2022 | Helms | E21B 47/007 |
| 2022/0341285 | A1 | 10/2022 | Werkheiser et al. | |
| 2023/0018892 | A1 | 1/2023 | Chouzenoux et al. | |
| 2024/0295158 | A1 | 9/2024 | Mitchell et al. | |

* cited by examiner

DEVICE AND METHOD OF EMPLOYING A MAGNETIC FIELD ANGLE SENSOR TO DETERMINE A HEALTH OF A SAFETY VALVE IN DOWNHOLE APPLICATIONS

CROSS-REFERENCE TO RELATED APPLICATION

This application claims the benefit of U.S. Provisional Application Ser. No. 63/614,266, filed on Dec. 22, 2023, entitled "WIRELINE RETRIEVABLE ELECTROMAGNETIC SAFETY VALVE," U.S. Provisional Application Ser. No. 63/614,231, filed on Dec. 22, 2023, entitled "METHODS TO PREDICT A HEALTH OF A SUBSURFACE SAFETY VALVE IN DOWNHOLE APPLICATIONS," U.S. Provisional Application Ser. No. 63/616,026, filed on Dec. 29, 2023, entitled "METHODS TO PREDICT A HEALTH OF A SUBSURFACE SAFETY VALVE IN DOWNHOLE APPLICATIONS," and U.S. Provisional Application Ser. No. 63/632,224, filed on Apr. 10, 2024, entitled "METHODS TO PREDICT A HEALTH OF A SUBSURFACE SAFETY VALVE IN DOWNHOLE APPLICATIONS USING ONE OR MORE MAGNETIC ANGLE SENSORS," all of which are commonly assigned with this application and incorporated herein by reference in their entirety.

BACKGROUND

Downhole devices, such as subsurface safety valves (SSSVs) are well known in the oil and gas industry and provide one of many failsafe mechanisms to prevent the uncontrolled release of subsurface production fluids, should a wellbore system experience a loss in containment. In certain instances, SSSVs comprise a portion of a tubing string, the entirety of the SSSVs being set in place during completion of a wellbore. In other instances, the SSSVs are wireline deployed/retrieved. Although a number of design variations are possible for SSSVs, the vast majority are flapper-type valves that open and close in response to longitudinal movement of a flow tube.

Since SSSVs typically provide a failsafe mechanism, the default positioning of the flapper valve is usually closed in order to minimize the potential for inadvertent release of subsurface production fluids. The flapper valve can be opened through various means of control from the earth's surface in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which.

Figure 4B:
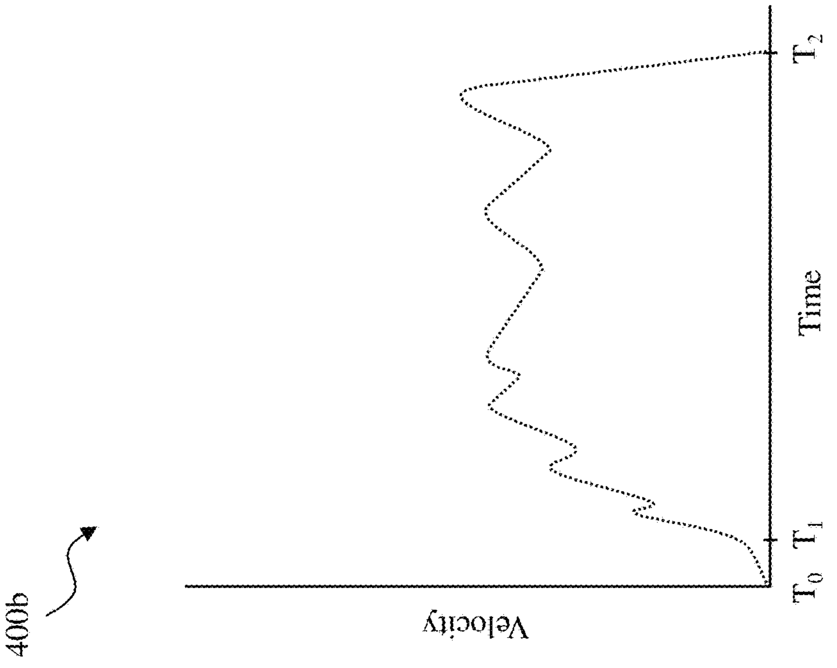
Figure 4A:
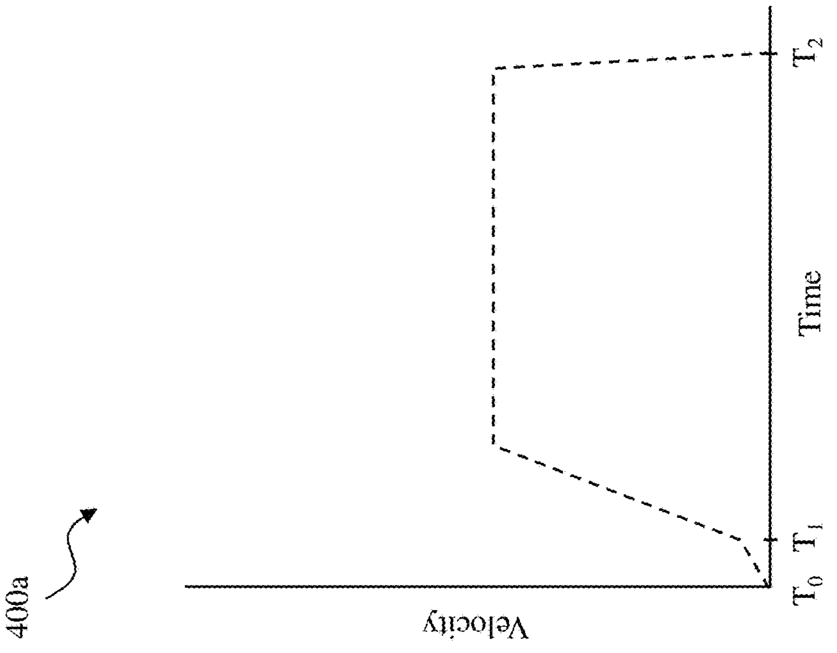
Figure 4C:
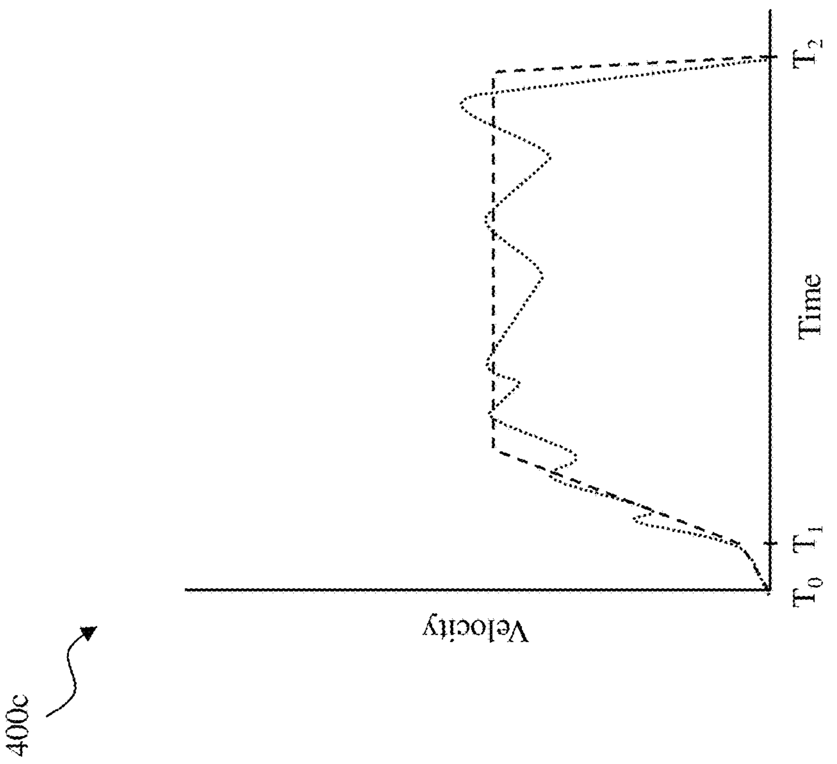
Figure 6:
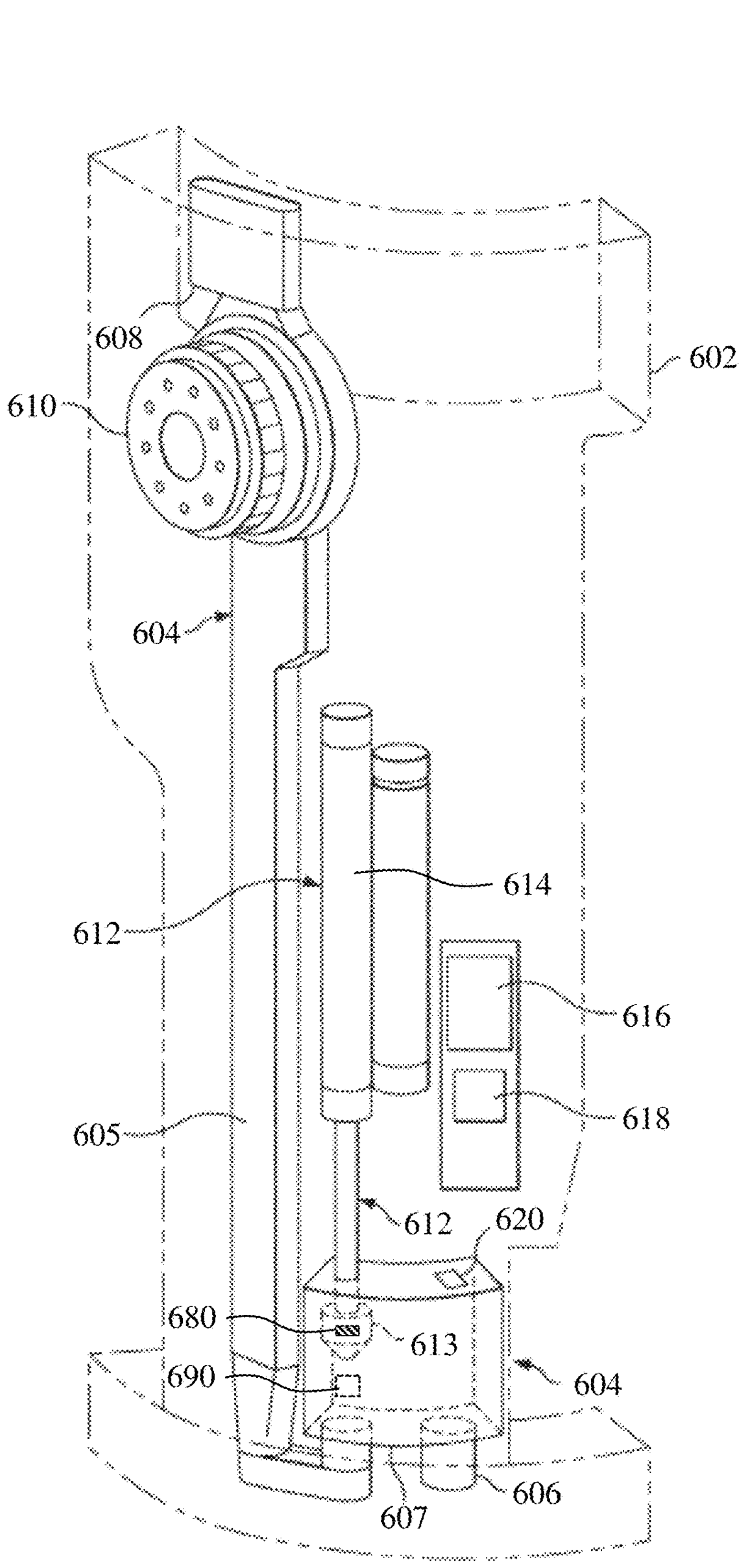
Figure 7A:
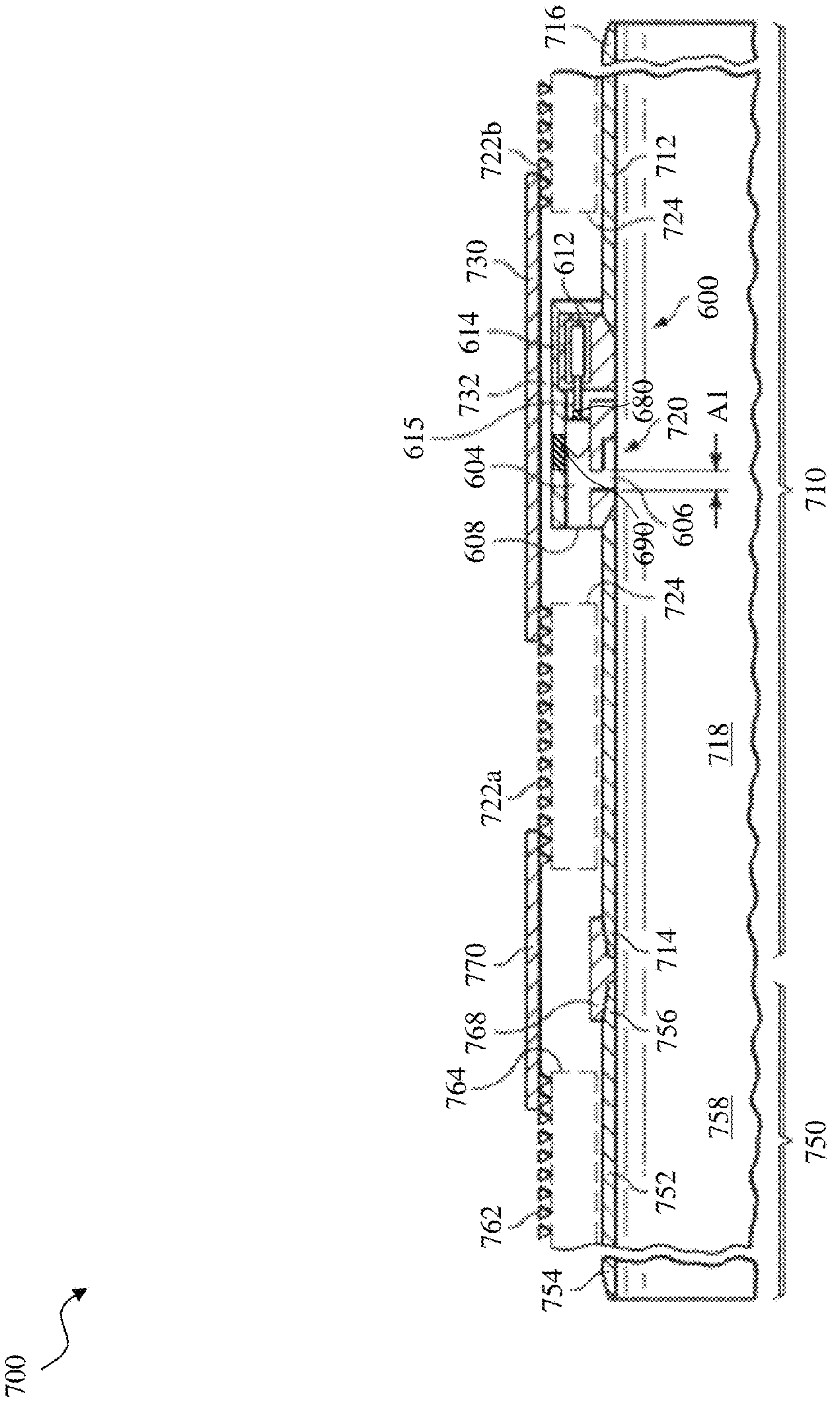
Figure 7B:
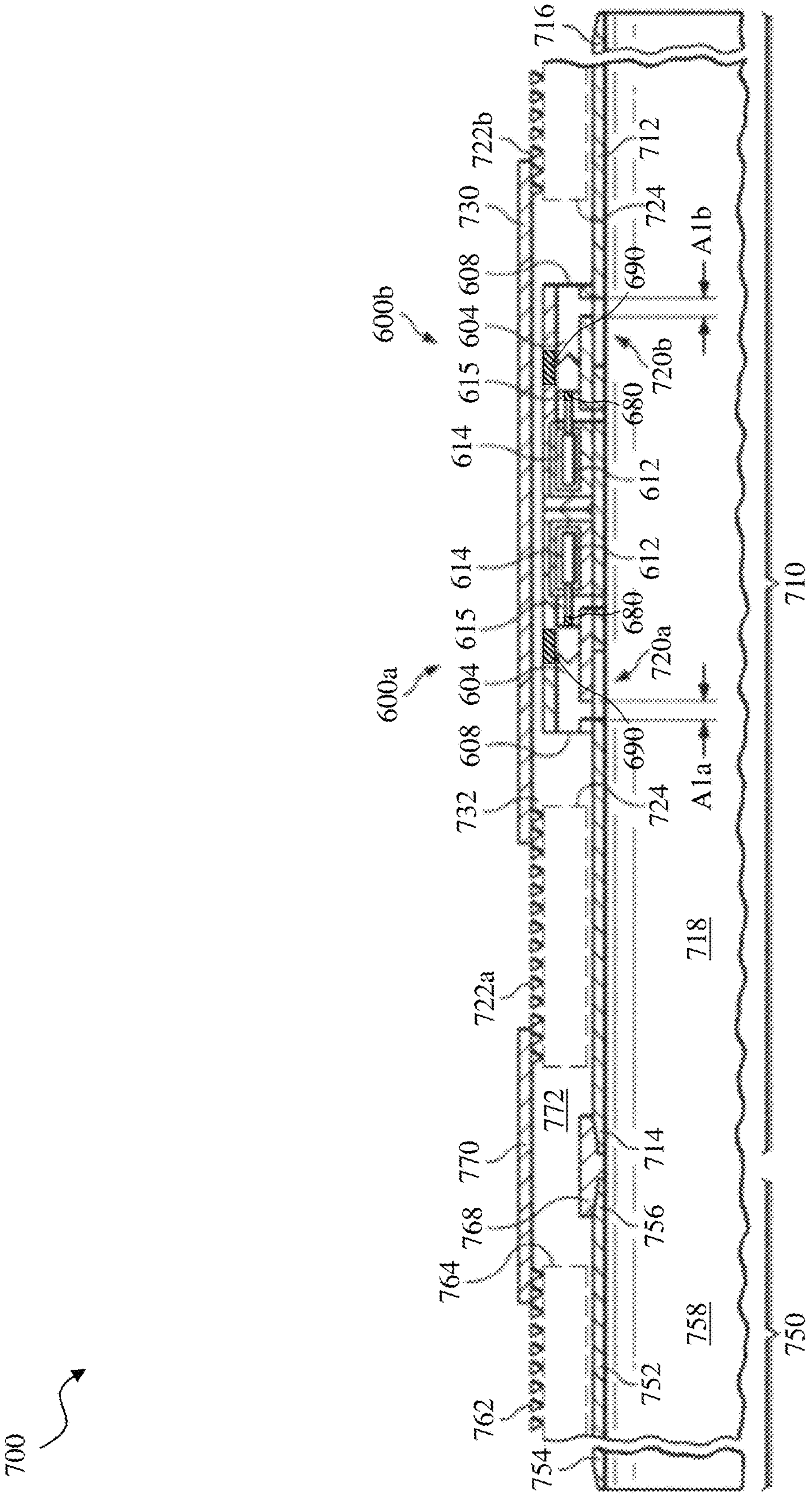

FIGS. 4A through 4C illustrate graphs showing ideal measurements of the flow tube main body velocity/acceleration versus time (e.g., FIG. 4A), actual measurement of the flow tube main body velocity/acceleration versus time (e.g., FIG. 4B), and a comparison of the ideal measurements of the flow tube main body velocity/acceleration versus time and the actual measurement of the flow tube main body velocity/acceleration versus time (e.g., FIG. 4C);

FIG. 5A through 5D illustrate one embodiment of a safety valve designed and manufactured according to one or more alternative embodiments of the present disclosure;

FIG. 6 illustrates one embodiment of an inflow control valve (ICV) designed, manufactured and/or operated according to one or more embodiments of the disclosure is illustrated, and that may take advantage of the one or more magnetic field sensors (e.g., magnitude or angle based sensors) and one or more permanent magnets described herein; and FIGS. 7A and 7B illustrate cross-sectional views of embodiments of a lower completion assembly with one or more inflow control valves (ICVs) as described in FIG. 6.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Furthermore, unless otherwise specified, use of the terms "up," "upper," "upward," "uphole," "upstream," or other like terms shall be construed as generally toward the surface of the subterranean formation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical axis. Additionally, unless otherwise specified, use of the term "subterranean formation" shall be construed as encompassing both areas below exposed earth and areas below earth covered by water such as ocean or fresh water.

Various values and/or ranges are explicitly disclosed in certain embodiments herein. However, values/ranges from any lower limit may be combined with any upper limit to recite a range not explicitly recited. Similarly, values/ranges from any lower limit may be combined with any other lower limit to recite a range not explicitly recited. In the same way, values/ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Similarly, an individual value disclosed herein may be combined with another individual value or range disclosed herein to form another range.

The term "substantially XYZ," as used herein, means that it is within 10 percent of perfectly XYZ. The term "significantly XYZ," as used herein, means that it is within 5 percent of perfectly XYZ. The term "ideally XYZ," as used herein, means that it is within 1 percent of perfectly XYZ. The monicker "XYZ" could refer to parallel, perpendicular, alignment, or other relative features disclosed herein.

The present disclosure has acknowledged that offshore wells are being drilled at ever increasing water depths and in environmentally sensitive waters, and thus safety valves (e.g., including subsurface safety valves (SSSVs)) are necessary. The present disclosure has further acknowledged that SSSVs have inherent problems, and thus from time to time need servicing and/or replacing. In fact, occasionally the tubing retrievable safety valve (TRSV) (e.g., electrically actuated TRSV) will fail, and then a wireline retrievable safety valve (WLRSV) will be run in hole. Unfortunately, each of the TRSV and the WLRSV require their own power source, such as individual tubing encapsulated conductors (TECs).

The present disclosure has developed an improved WLRSV. In at least one embodiment, the WLRSV includes a first portion that is run-in-hole with the TRSV and second and third portions that are run-in-hole after the TRSV is no longer working properly and/or has failed. The first portion of the WLRSV, in at least one embodiment, includes a safety valve sub (e.g., WLRSV sub) that would be run-in-hole along with another safety valve sub (e.g., TRSV sub), and for example the tubing string. In at least one embodiment, the safety valve sub would be located above the TRSV sub. In at least one other embodiment, the safety valve sub would include an electromagnetic assembly (e.g., including one or more coils) (e.g., coupleable to the primary control line (e.g., single TEC)), as well as a sliding sleeve. The sliding sleeve, in this embodiment, would be configured to slide toward, and then magnetically engage with the electromagnetic assembly when the electromagnetic assembly is energized. In at least one other embodiment, the safety valve sub could include an electromagnetic assembly (e.g., including one or more coils) (e.g., coupleable to the primary control line (e.g., single TEC) via the below discussed switch system), as well as the sliding sleeve. In some embodiments, the electromagnetic assembly creates a static magnetic attraction. In other embodiments, the electromagnetic assembly is an electric motor that creates a torque that can drive a linear actuator.

The WLRSV, in one or more embodiments, further includes the second portion of the WLRSV, which is run-in-hole after the TRSV is no longer working properly and/or has failed. The second portion of the WLRSV, in accordance with one or more embodiments, may be run-in-hole within the TRSV, for example using a latch mechanism to axially fix the second portion of the WLRSV within the TRSV. The second portion of the WLRSV, in one or more embodiments, may include a bore flow management actuator and a valve closure mechanism, and may be located below the first portion of the WLRSV including the electromagnetic assembly and the sliding sleeve.

The WLRSV, in one or more embodiments, further includes a third portion that is run-in-hole after the second portion of the WLRSV is latched downhole (e.g., latched within the TRSV). The third portion, in one or more embodiments, is a mechanical connecting apparatus. For example, in accordance with one or more embodiments of the disclosure, once the second portion of the WLRSV is latched in place, the mechanical connecting apparatus may be run-in-hole between the sliding sleeve of the first portion and the bore flow management actuator of the second portion. In essence, the mechanical connecting apparatus may be run-in-hole to axially fix the sliding sleeve of the first portion of the WLRSV with the bore flow management actuator of the second portion of the WLRSV. Accordingly, any axial movement of the bore flow management actuator would result in the same axial movement of the sliding sleeve, and vice-versa.

In operation, once the mechanical connecting apparatus is in place, fluid pressure (e.g., from within the tubular below the valve closure mechanism) may urge the bore flow management actuator toward the valve closure mechanism. Typically, the bore flow management actuator is unable to move past the valve closure mechanism until a pressure differential across the valve closure mechanism is reduced/eliminated. Once the pressure differential across the valve closure mechanism is reduced/eliminated, for example by pumping fluid down the wellbore toward an uphole side of the valve closure mechanism, the bore flow management actuator may be urged past the valve closure mechanism, for example using one or more springs (e.g., power springs and/or nose springs). As the sliding sleeve is axially fixed to the bore flow management actuator, the axial movement of the bore flow management actuator also axially moves the sliding sleeve. This axial movement of the sliding sleeve brings a ferromagnetic target associated with the sliding sleeve proximate the electromagnetic assembly of the first portion. Accordingly, when the electromagnetic assembly is energized (e.g., before, during or after the ferromagnetic target approaches the one or more coils), the sliding sleeve, and thus the bore flow management actuator axially fixed thereto, may be held in the flow state. The sliding sleeve and the associated bore flow management actuator will be held in this flow state until such time as the electromagnetic assembly is no longer energized, such as when power is turned off to or cut from the electromagnetic assembly.

The present disclosure has further developed a safety valve that allows the user to predict the health of the safety valve in downhole applications. In at least one embodiment, the present disclosure uses one or more permanent magnets, as well as one or more magnetic field sensors (e.g., GMR sensors), to sense the movement of actuatable features within the safety valve. For example, a first permanent magnet could be coupled with the flow tube main body of the safety valve, and a first magnetic field sensor may be used to sense various aspects related to the movement of the flow tube main body. For example, a measurement of the flow tube main body velocity/acceleration versus time could be obtained. In one or more embodiments, the actual measurement of the flow tube main body velocity/acceleration versus time could be compared to the ideal flow tube main body velocity/acceleration versus time, which could indicate that there is something impeding the proper movement of the flow tube main body (e.g., scale). Similar information may be obtained from a measurement of flow tube main body movement versus time.

In yet another embodiment, the motion versus applied force could be compared. "Motion", in at least one embodiment, is the movement or the time rate of change of that movement. Similarly, "applied force", in at least one embodiment, is the applied pressure of the hydraulic fluid in a hydraulic valve, the pumped fluid volume/rate in a hydraulic valve, the motor current/voltage in an electric valve, or a direct measure of force, among others. For example, one could look at the applied force needed for the onset of motion, among others discussed herein. This is a measure of the friction in the system as well as the response delay in the actuator or in the brake release. For example, the applied force before the safety valve starts to move may be measured. Likewise, a determination of a position of the safety valve when the force increases dramatically at the end of the stroke may be determined, among other measurements and/or determinations. The force, in one or more embodiments, may be measured directly or indirectly. Direct measurement includes a force measurement such as a load cell, among others. Indirect measurement includes measuring the pressure in a hydraulic line or the voltage/current/power in an electrical system, among others.

In yet another embodiment, one or more second permanent magnets are coupled with the valve closure mechanism (e.g., flapper valve, ball valve, etc.) of the safety valve, and a second magnetic field sensor may be used to sense various aspects related to the movement of the valve closure mechanism. For example, the second magnetic field sensor could be used to sense a position of the valve closure mechanism. In at least one embodiment, the second magnetic field sensor is able to sense whether the valve closure mechanism is open or closed. In yet another embodiment, the second magnetic field sensor is able to sense a position (e.g., angle) of the valve closure mechanism even if it is neither fully open nor fully closed.

Most any abnormality can be identified by looking at the data points obtained by the magnetic field sensor(s) (e.g., over time). For example, the data points taken over time could be used to sense the health of the safety valve, and if it appears that the safety valve is encountering problems, develop a plan for fixing the safety valve. In fact, such information may be used to sense issues of the safety valve that may be corrected prior to the safety valve actually failing. Moreover, such an idea may be used on all types of safety valves, TRSVs and WLRSVs included.

In at least one other embodiment, the present disclosure employs a magnetic field angle sensor to detect the position of a moving element of a safety valve (e.g., the flow tube, the valve, etc.). In at least one embodiment, the magnetic field angle sensor is fixed as the permanent magnetic moves, and thus detects the position of the moving element of the safety valve. In yet another embodiment, the magnetic field angle sensor moves while the permanent magnetic is fixed, and thus detects the position of the moving element of the safety valve. Multiple measurements can be combined in order to estimate the velocity of the moving element and the acceleration/jerk of the moving element movement. Measurements from multiple sensors can be combined to improve the accuracy of the position/speed/acceleration/jerk estimation.

In at least one embodiment, magnetic materials are embedded in the moving element of the safety valve, such as the flow tube, valve, or any other moving element. The magnetic materials can be a permanent magnet or a variation in the magnetic permeability (like that of a ferromagnetic material such as iron). The magnetic field angle sensor can be a single sensor, or an array of uniformly or non-uniformly spaced magnetic field angle sensors. The magnetic field angle sensors, in one embodiment, are deployed outside the housing of the moving element. The sensor array may be configured to measure the magnetic field angle as the magnetic material moves (e.g., translates, rotates, etc.). The position of the moving element and its velocity may be estimated from a localization algorithm that uses magnetic field angle sensor data from some or all the sensors.

Figure 1A:
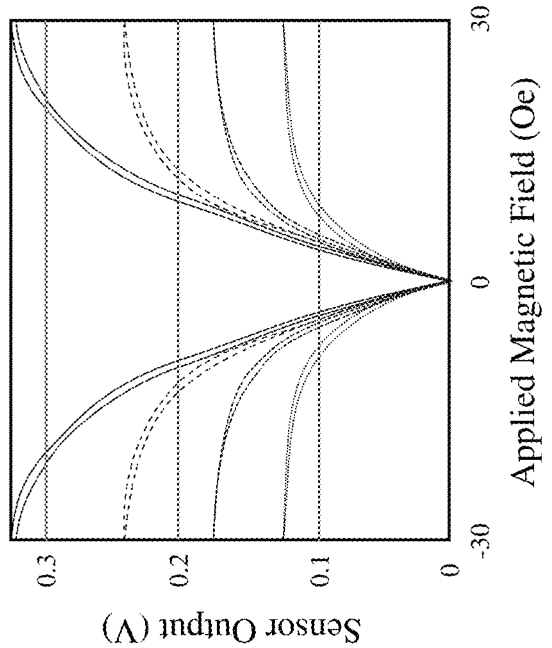
FIG. 1A illustrates that the sensitivity of magnetic amplitude sensors may vary with temperature changes.

Thus, in this embodiment, magnetic field angle is used instead of magnetic field strength for the estimation of the location, velocity, acceleration, etc. of the moving element. The present disclosure has found that the magnetic field strength of the magnetic material deteriorates over the time (e.g., due to the harsh environment in the downhole), but the magnetic field angle remains the same. The magnitude of the magnetic field from a permanent magnet will vary with the environmental conditions. The magnetic strength is sensitive to the distance between the sensors and the ferrous casing. It will also change with temperature. The sensitivity of magnetic amplitude sensors will also vary with temperature, as shown in FIG. 1A. Additionally, the magnetic amplitude will have a large hysteretic effect.

Figure 1B:
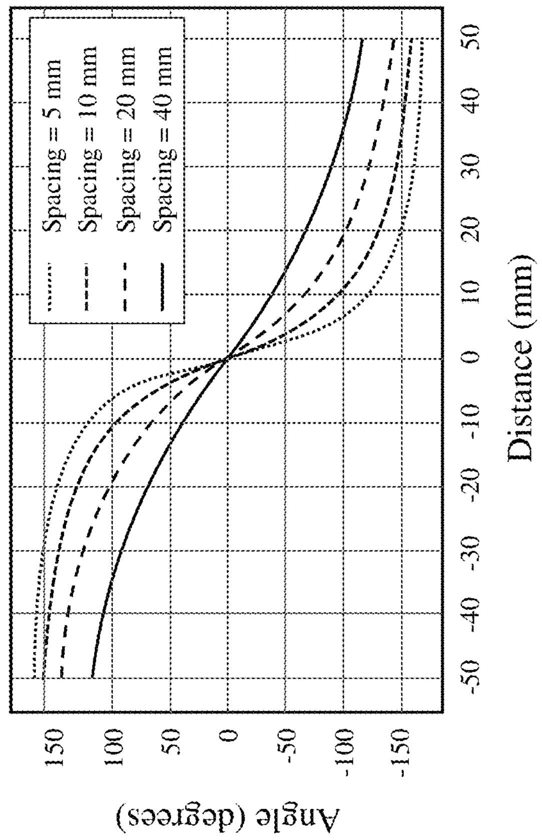
FIG. 1B illustrates that the angle generated by a magnetic field is robust with temperature changes and with varying (but known) distance between the magnet and the angle sensor.

The magnetic field angle sensor, on the other hand, is solely a function of the angle generated by the magnetic field. This measurement is robust with temperature changes and with varying (but known) distance between the magnet and the angle sensor, such as shown in FIG. 1B. The hysteresis is also much reduced. Accordingly, the present disclosure has recognized that the magnetic field angle sensor provide more accurate estimation of position, for example than magnetic field strength sensors.

The magnetic angle is determined, at least in one embodiment, with GMR angle sensors or with the Tunnelling magnetoresistance (TMR) angle sensors, both of which provide much higher resolution than the Hall-effect sensors. Both the GMR and the TMR angle sensors use the magnetoresistive effect where the electrical resistance changes with magnetic field. Tunnel magnetoresistance is a magnetoresistive effect that occurs in a magnetic tunnel junction MTJ, which is a component consisting of two ferromagnets separated by a thin insulator. If the insulating layer is thin enough (typically a few nanometers obtained through thin film technology such as sputter deposition, laser deposition, physical vapor deposition, or molecular epitaxy), electrons can tunnel from one ferromagnet into the other. Since this process is forbidden in classical physics, the tunnel magnetoresistance is a strictly quantum mechanical phenomenon, and lies in the study of spintronics.

In at least one embodiment, the present disclosure uses the data fusion from multiple sensors to reduce the uncertainty in the position estimation and thus, improves the accuracy of position and speed estimation.

Figure 1C:
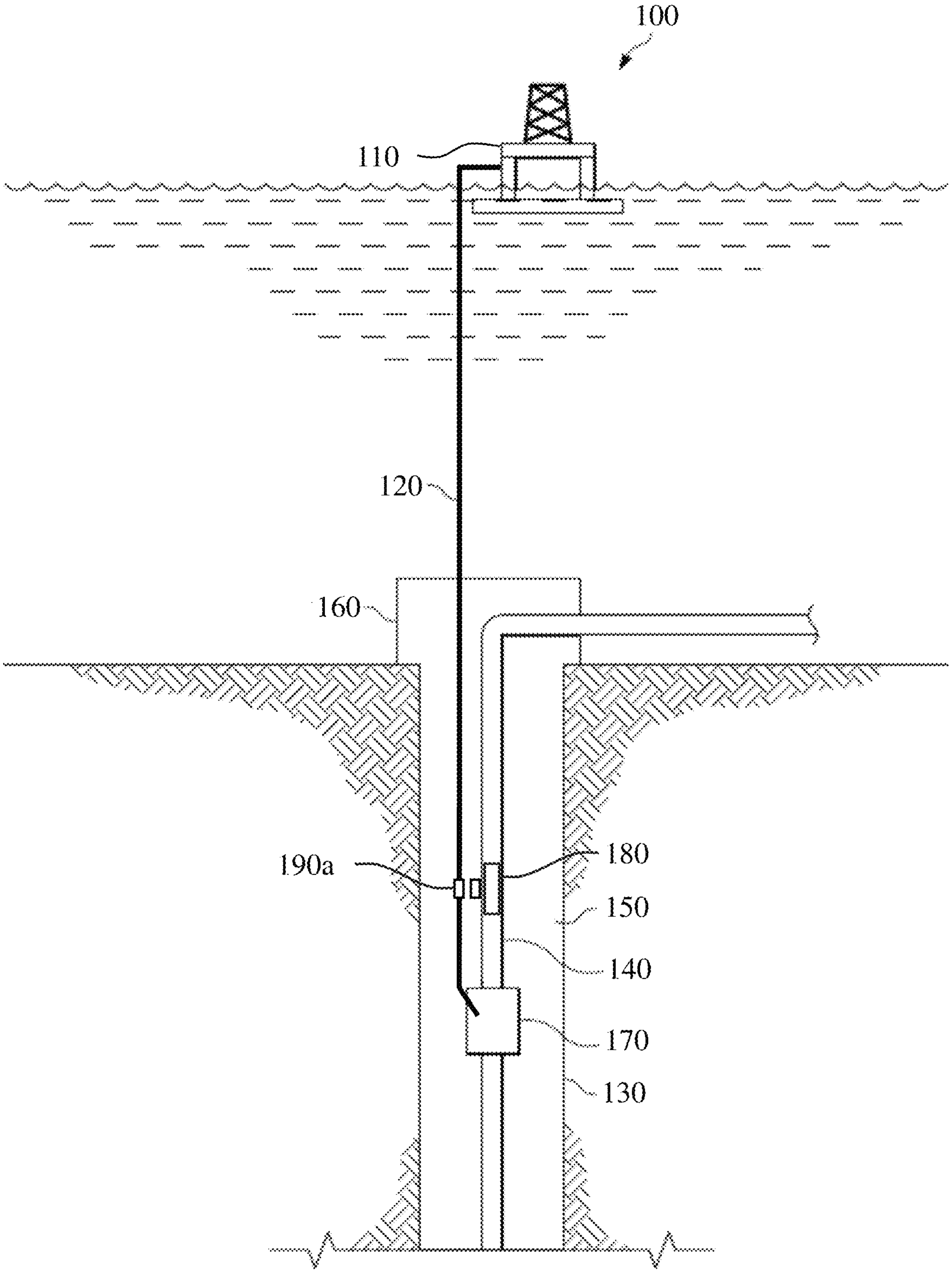
FIG. 1C illustrates a well system designed, manufactured and/or operated according to one or more embodiments of the disclosure.

FIG. 1C illustrates a well system 100 designed, manufactured and/or operated according to one or more embodiments of the disclosure. The well system 100, in at least one embodiment, includes an offshore platform 110 connected to a first downhole device 170 (e.g., first SSSV, such as a TRSV) insert within a wellbore 130 (e.g., the wellbore extending through a subterranean formation) and a second downhole device 180 (e.g., second SSSV, such as a WLRSV) insert within the wellbore 130 via a primary electric control line 120 (e.g., single electrical control line, TEC, etc.). In at least one embodiment, the second downhole device 180 is an electrical connection for a WLRSV. For example, the electrical connection may be an inductive coupling, a capacitive coupling, or a conductive coupling with direct electrical contact, among others. An annulus 150 may be defined between walls of the wellbore 130 (e.g., extending through one or more subterranean formations) and a conduit 140 (e.g., production tubing). A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore. The first downhole device 170, or at least a portion thereof, may be interconnected with the conduit 140 (e.g., disposed in line with the conduit 140) and positioned in the wellbore 130. The second downhole device 180, or at least a portion thereof, may be interconnected with the conduit 140 (e.g., positioned within an ID or OD of the conduit 140) and positioned in the wellbore 130. In the illustrated embodiment, the second downhole device 180 is illustrated uphole of the first downhole device 170 (e.g., a portion of it being run-in-hole with the first downhole device 170 and another portion of it being run-in-hole after the first downhole device 170 has failed), but other embodiments may exist wherein the second downhole device 180 is located downhole of the first downhole device 170.

The primary electric control line 120 may extend into the wellbore 130 and may be connected to the first downhole device 170 and the second downhole device 180. The primary electric control line 120 may provide actuation power to the first downhole device 170 and the second downhole device 180. As will be described in further detail below, power may be provided to first downhole device 170 or the second downhole device 180 to actuate or de-actuate the first downhole device 170 or the second downhole device 180. Actuation may comprise opening the first downhole device 170 or the second downhole device 180 to provide a flow path for subsurface production fluids to enter conduit 140, and de-actuation may comprise closing the first downhole device 170 or the second downhole device 180 to close a flow path for subsurface production fluids to enter conduit 140. While the embodiment of FIG. 1C illustrates only the first downhole device 170 and the second downhole device 180, other embodiments exist wherein more than two downhole devices according to the disclosure are used.

In accordance with one embodiment of the disclosure, the well system 100 may further include a switch system 190*a* positioned between the primary electric control line 120 and each of the first downhole device 170 and the second downhole device 180. The switch system 190*a* may be configured to switch the incoming power from the primary electric control line 120 between the first downhole device 170 and the second downhole device 180, depending on which of the first downhole device 170 or the second downhole device 180 that the operator intends to operate (e.g., actuate). In at least one embodiment, the first downhole device 170 includes a first electrical devices (e.g., electromagnetic coils, electric motor or pump, piezoelectric actuator, solenoid valve, etc.) and the second downhole device 180 includes a second electrical devices (e.g., electromagnetic coils, electric motor or pump, piezoelectric actuator, solenoid valve, etc.), and the switch system 190*a* is configured to switch the incoming power from the primary electric control line 120 between the first electrical device of the first downhole device 170 and the second electrical device of the second downhole device 180. Although the well system 100 is depicted in FIG. 1C as an offshore well system, one of ordinary skill should be able to adapt the teachings herein to any type of well, including onshore or offshore. In the embodiment of FIG. 1C, the first downhole device 170 is a TRSV, and the second downhole device 180 is a WLRSV, and the methods, magnets, and magnetic field sensors disclosed herein may be used in one or more of the first downhole device 170 and the second downhole device 180.

Figure 2A:
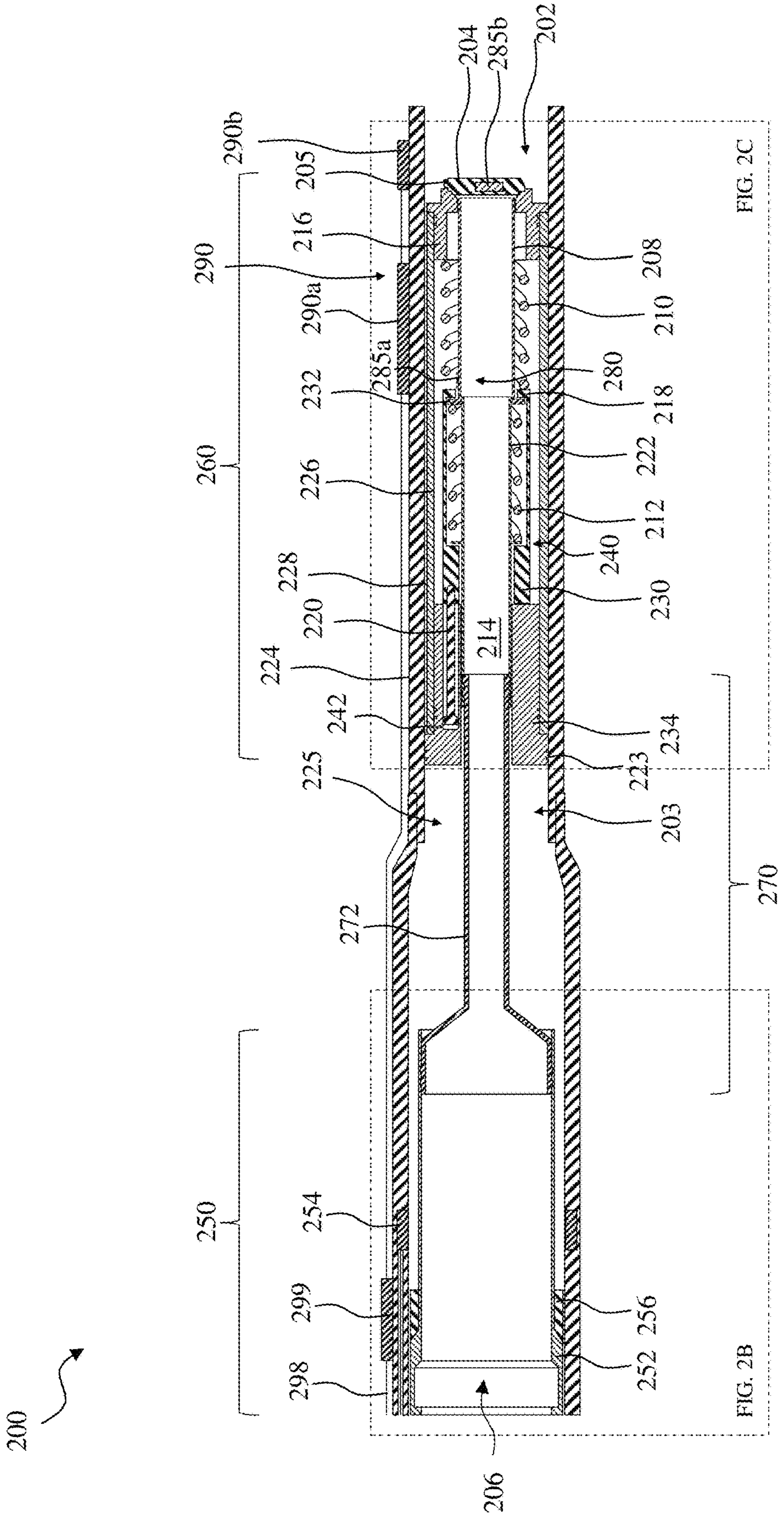
FIGS. 2A through 2F illustrate one embodiment of a downhole device, including a safety valve designed, manufactured and/or operated according to one or more embodiments of the disclosure.
Figure 2B:
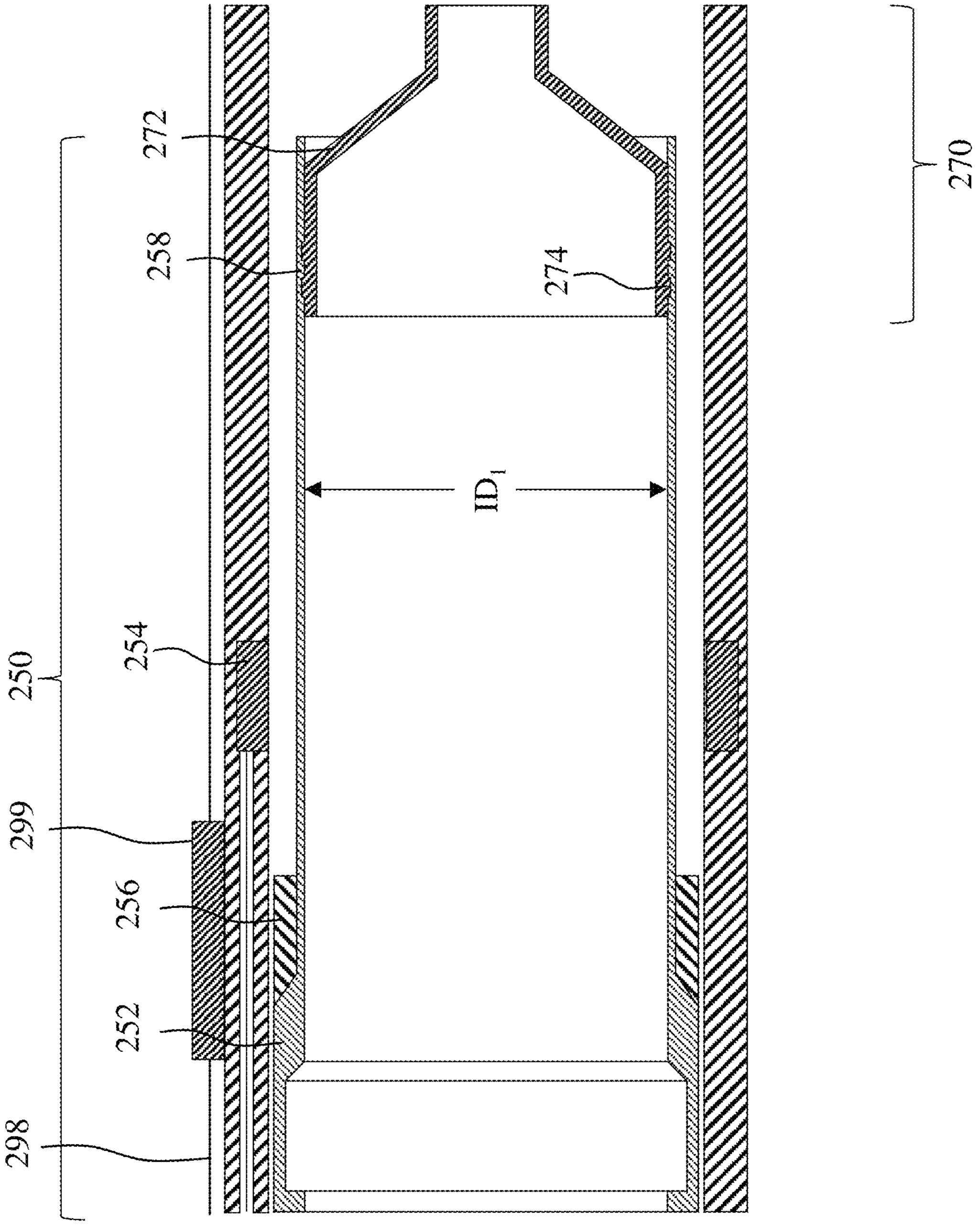
Figure 2C:
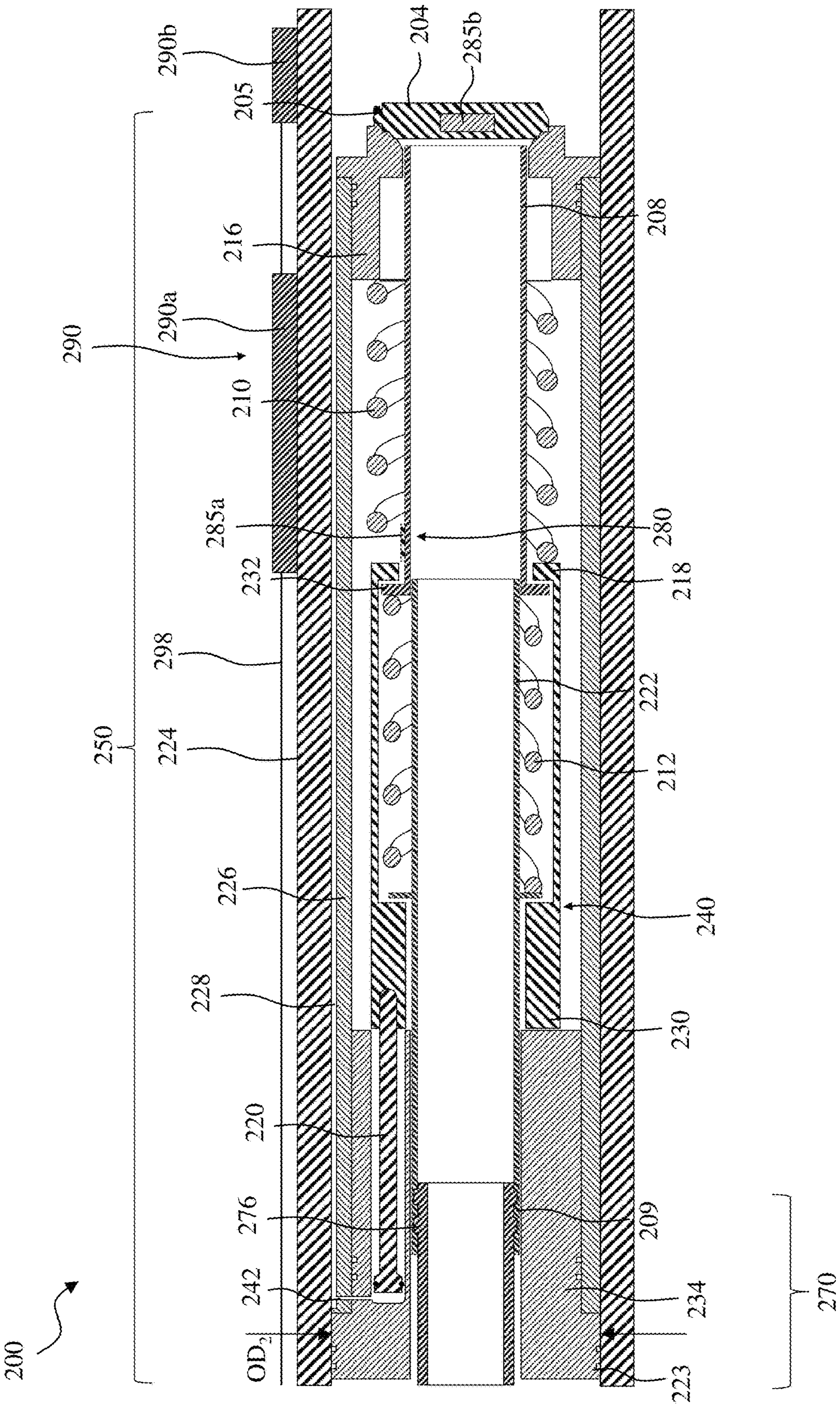
Figure 2D:
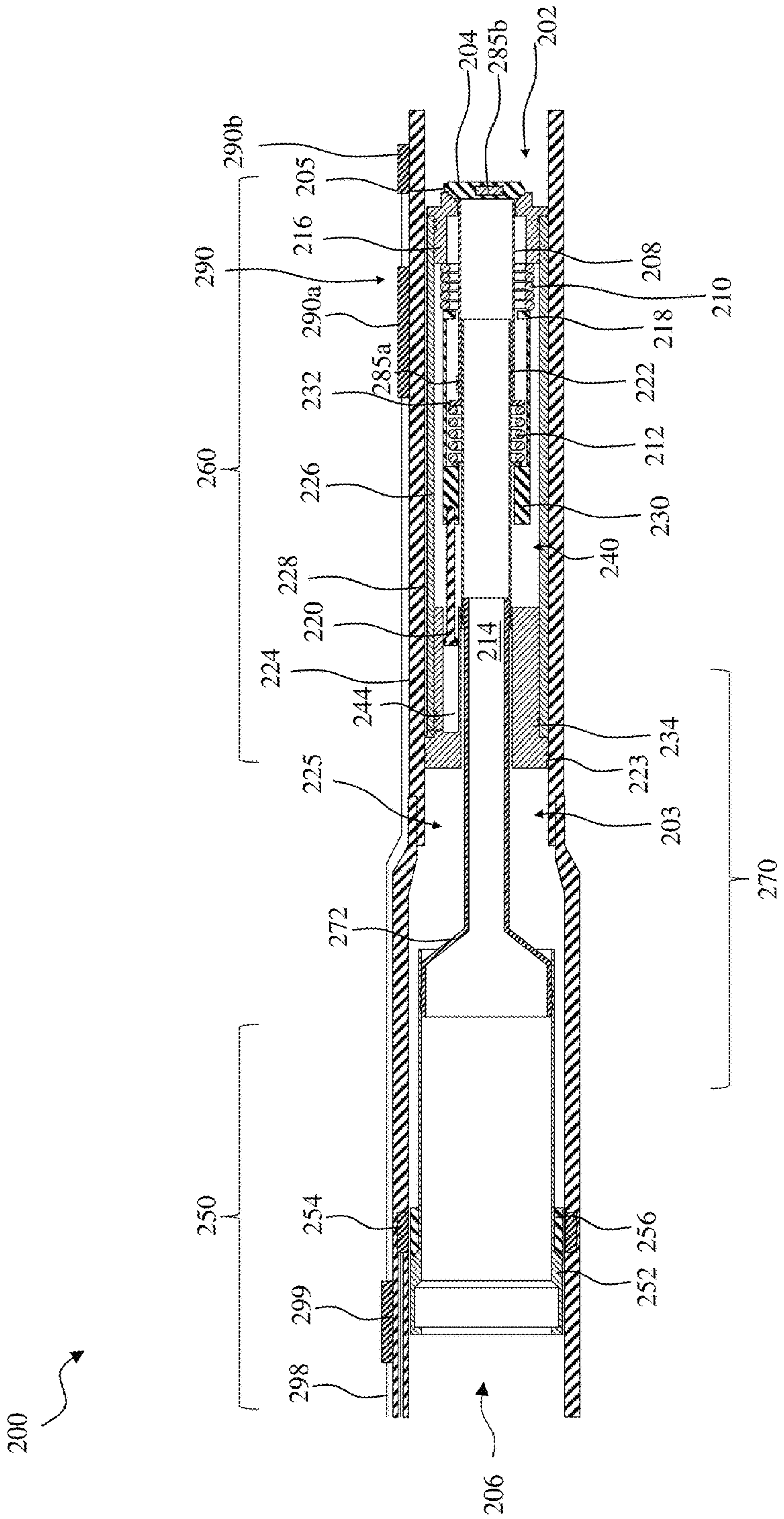
Figure 2E:
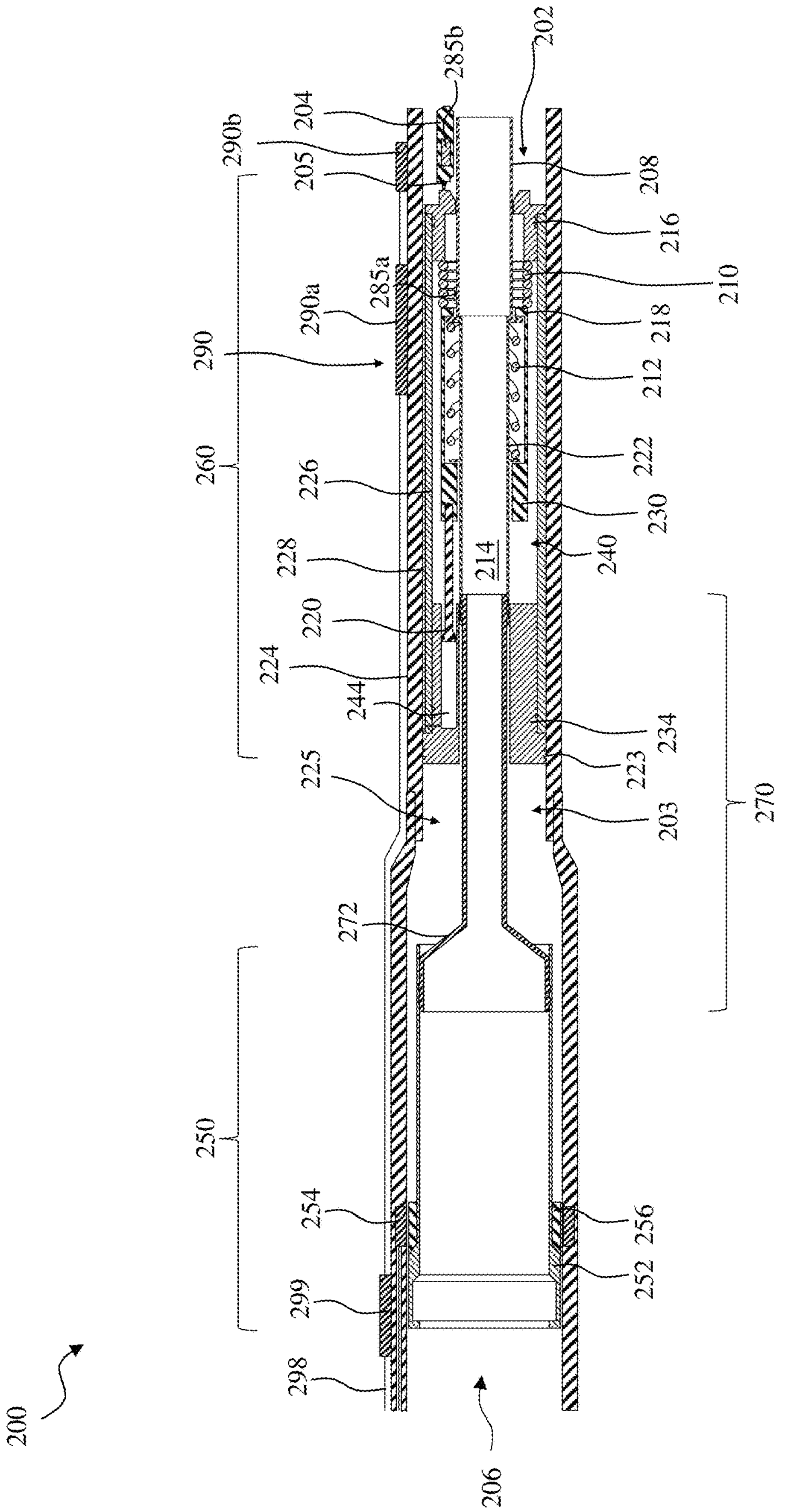
Figure 2F:
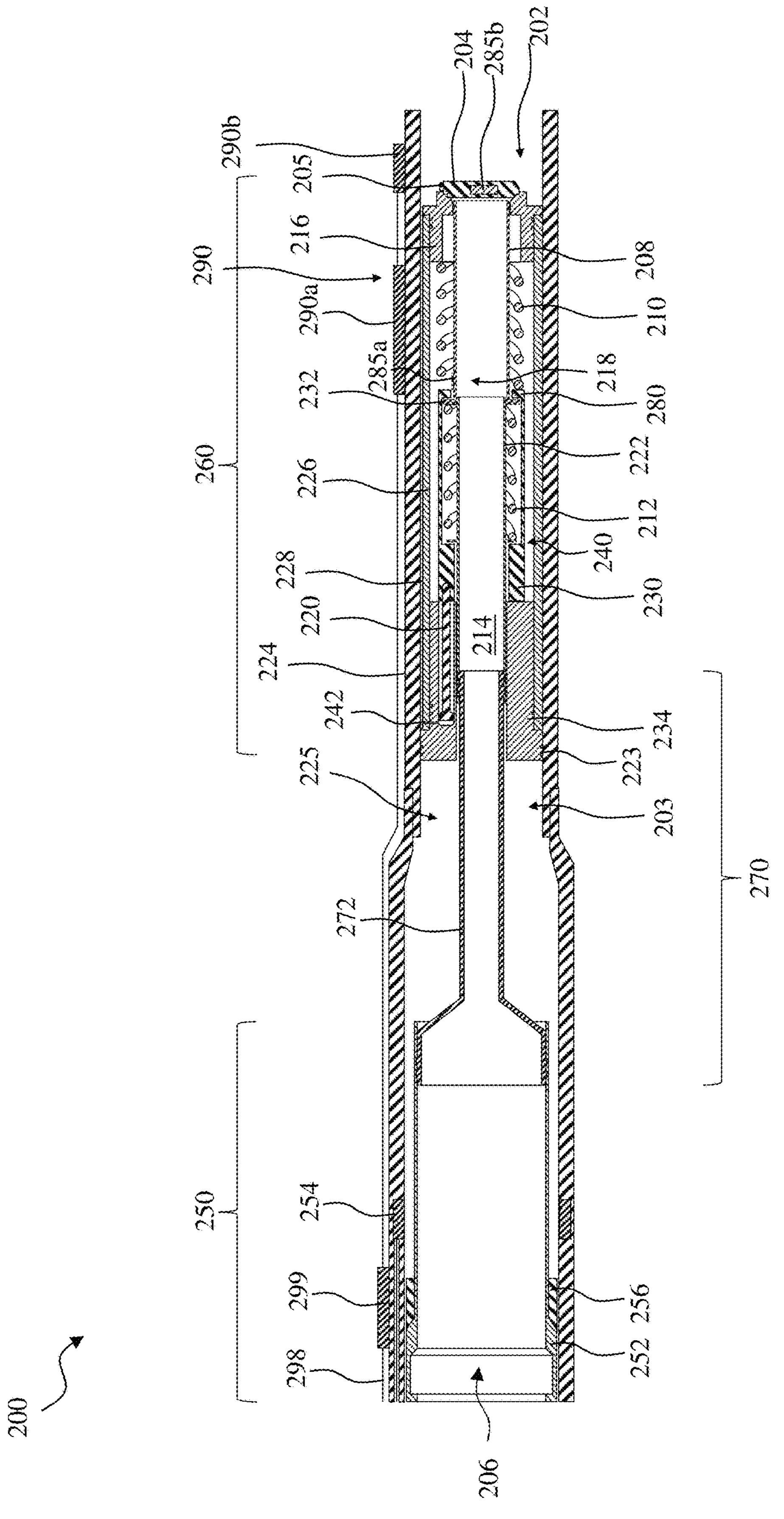

Turning to FIGS. 2A through 2F illustrated is one embodiment of a downhole device, including a safety valve 200 designed, manufactured and/or operated according to one or more embodiments of the disclosure, as might employ the first, second and third portions of the WLRSV, as discussed above. FIGS. 2A through 2C illustrate different views of the safety valve 200 in a first closed position, its unpowered electromagnetic assembly and magnetic target decoupled from one another. FIG. 2D illustrates the safety valve 200 of FIGS. 2A through 2C in a second closed position with power (DC power in this embodiment) supplied to the electromagnetic assembly, thereby coupling the electromagnetic assembly and the magnetic target together. FIG. 2E illustrates the safety valve 200 of FIG. 2D now in an open position, the powered (DC powered) electromagnetic assembly and magnetic target remaining magnetically coupled (e.g., fixedly coupled) with one another. FIG. 2F illustrates the safety valve 200 of FIG. 2E after power (DC power) has been cut to the electromagnetic assembly, and thus the safety valve 200 returns to the first closed position. In yet another embodiment, the safety valve 200 may be indirectly moved back to the first closed position, for example if an electrical logic circuit determines that the electrical power has been interrupted and initiates a closing of the safety valve 200.

Referring initially to FIGS. 2A through 2C, the safety valve 200 is illustrated in the first closed position. The safety valve 200, in one or more embodiments, may include an outer housing 224 (e.g., wellbore tubing) containing a central bore 225 therein, wherein components of the safety valve 200 may be disposed within the central bore 225. An upper valve assembly 234 (e.g., also the magnetic target in this embodiment) may be attached to the outer housing 224, and may further include one or more sealing elements 223, such that fluid communication from a lower section 202 to an upper section 203 is prevented.

A sleeve 226 may be attached between the upper valve assembly 234 and a lower valve assembly 216. A bore flow management actuator 240 may be disposed within the sleeve 226. The bore flow management actuator 240 may include a translating sleeve 222 and a flow tube main body 208. A flow path 214 may be defined by an interior of the flow tube main body 208. As illustrated in FIGS. 2A through 2C, the flow path 214 may extend from an interior of a conduit 206 through an interior of the flow tube main body 208. As will be discussed in further detail below, when the safety valve 200 is in an open position, the flow path 214 may extend from an interior of the conduit 206 through an interior of the flow tube main body 208 and further into the lower section 202.

The safety valve 200 may further include a power spring 210 disposed between the lower valve assembly 216 and a translating sleeve shoulder 218. As illustrated in FIGS. 2A through 2C, the translating sleeve shoulder 218 and a flow tube shoulder 232 may be in contact when the safety valve 200 is in the first closed position. The power spring 210 may provide a positive spring force against the translating sleeve shoulder 218, which may keep the flow tube main body 208 in a first position. The power spring 210 may also provide a positive spring force to return the flow tube main body 208 and the translating sleeve 222 to the first position (e.g., from a second position), as will be explained below.

The safety valve 200 may further include a nose spring 212 disposed between a translating sleeve assembly 230 and the flow tube shoulder 232. The translating sleeve assembly 230 may be disposed between and attached to a piston 220 and the translating sleeve 222. The power spring 210 and the nose spring 212 are depicted as coil springs in FIGS. 2A through 2F. However, the power spring 210 and the nose spring 212 may comprise any kind of spring and remain within the scope of the present disclosure, such as, for example, coil springs, wave springs, or fluid springs, among others.

In the illustrated embodiment, the translating sleeve assembly 230 may allow a force applied to a distal end of the piston 220 to be transferred into the translating sleeve 222. A force may be applied to the distal end of the piston 220 by way of fluid communication from a channel 228 through an orifice 242. A force applied to the piston 220 may move the translating sleeve 222 from a first position to a second position. The nose spring 212 may provide a positive spring force against the translating sleeve assembly 230 and the flow tube shoulder 232, which may return the translating sleeve 222 from the second position to the first position, as will be discussed in greater detail below.

In the first closed position, the translating sleeve 222 and the flow tube main body 208 are positioned such that the translating sleeve shoulder 218 and the flow tube shoulder 232 are in contact and the power spring 210 and the nose spring 212 are in an extended position. In the first closed position, the translating sleeve 222 may be referred to as being in a first position and the flow tube main body 208 may be referred to as being in a first position.

In at least one embodiment, the bore flow management actuator 240 is configured to slide from a first initial state to a first subsequent state to move a valve closure mechanism 204 between a first closed state and a first open state. In the first closed state, the valve closure mechanism 204 may isolate the lower section 202 from the flow tube main body 208. When the valve closure mechanism 204 is in a first closed state, as in FIGS. 2A through 2C, the valve closure mechanism 204 may prevent formation fluids and pressure from flowing into the flow tube main body 208 from the lower section 202. Although FIGS. 2A through 2C illustrate the valve closure mechanism 204 as a flapper valve, the valve closure mechanism 204 may be any suitable type of valve such as a flapper type valve or a ball type valve, for example. As will be illustrated in further detail below, the valve closure mechanism 204 may be actuated into a first open state to allow formation fluids to flow from the lower section 202 through the flow path 214 (e.g., defined by the lower section 202, an interior of the flow tube main body 208 and an interior of the conduit 206).

When the safety valve 200 is in the first closed position, no amount of differential pressure across the valve closure mechanism 204 will allow formation fluids to flow from the lower section 202 into the flow path 214. In the first closed position, the safety valve 200 will only allow fluid flow from conduit 206 into the lower section 202, but not from the lower section 202 into the conduit 206. In the instance that pressure in the conduit 206 is increased, the valve closure mechanism 204 will remain in the closed position until the pressure in the conduit 206 is increased above the pressure in the lower section 202 plus the closing pressure provided by the valve closure mechanism spring 205, sometimes referred to herein as valve opening pressure. When the valve opening pressure is reached, the valve closure mechanism 204 may open and allow fluid communication from the conduit 206 into the lower section 202. In this manner, treatment fluids such as surfactants, scale inhibitors, hydrate treatments, and other suitable treatment fluids may be introduced into the subterranean formation. The configuration of the safety valve 200 may allow treatment fluids to be pumped from a surface, such as a wellhead, into the subterranean formation without actuating a control line or balance line to open the valve. Once pressure in the conduit 206 is decreased below the valve opening pressure, the valve closure mechanism spring 205 will return the valve closure mechanism 204 to the closed position, and thus flow from the conduit 206 into the lower section 202 will cease. When the valve closure mechanism 204 has returned to the closed position, flow from the lower section 202 into the flow path 214 will be prevented. Should a pressure differential across the valve closure mechanism 204 be reversed, such that pressure in the lower section 202 is greater than a pressure in the conduit 206, the valve closure mechanism 204 will remain in a closed position, such that fluids in the lower section 202 are prevented from flowing into the conduit 206.

In the illustrated embodiment, the safety valve 200 includes a first portion 250, a second portion 260 (e.g., the second portion 260 may include those features disclosed in the paragraph above, for example those feature located between the upper valve assembly 234 and the valve closure mechanism 204, and specifically the bore flow management actuator 240 and the valve closure mechanism 204), and a third portion 270. As indicated above, in at least one embodiment, the first portion 250 has a first portion minimum inside diameter ($ID_1$) and is run-in-hole with the TRSV, and the second portion 260 and the third portion 270 are run-in-hole after the TRSV is no longer working properly and/or has failed. For example, in at least one embodiment, the second portion 260 has a second portion maximum outside diameter ($OD_2$), the second portion maximum outside diameter ($OD_2$) being less than the first portion minimum inside diameter ($ID_1$) such that the second portion 260 may be run-in-hole after the first portion 250. Furthermore, the third portion 270 may be run-in-hole in a separate step after the second portion 260.

In one or more embodiments, the first portion 250 includes a sliding sleeve 252, and an electromagnetic assembly 254. The sliding sleeve 252, in one or more embodiments, may also include a magnetic target 256 configured to magnetically couple with the electromagnetic assembly 254. In at least one embodiment, the magnetic target 256 is coupled to the sliding sleeve 252 and the electromagnetic assembly 254 is axially fixed with the wellbore tubing. In at least one embodiment, the magnetic target 256 is configured to slide with the sliding sleeve 252 and align with and couple to the electromagnetic assembly 254. The sliding sleeve 252, in one or more embodiments, additionally includes a sliding sleeve profile 258 located along an inside diameter (ID) thereof. In the illustrated embodiment, the electromagnetic assembly 254 is located in the outer housing 224 and the magnetic target 256 is located on the sliding sleeve 252, but the opposite could be designed.

In one or more other embodiments, the third portion 270 includes a mechanical connecting apparatus 272, the mechanical connecting apparatus 272 axially fixing together the sliding sleeve 252 of the first portion 250 and at least a portion of the bore flow management actuator 240 of the second portion 260. In the illustrated embodiment, the mechanical connecting apparatus 272 includes an uphole mechanical connecting apparatus profile 274 configured to engage with the sliding sleeve profile 258 of the sliding sleeve 252, as well as a downhole mechanical connecting apparatus profile 276 configured to engage with a bore flow management actuator profile 209 of the bore flow management actuator 240 (e.g., translating sleeve 222 of the bore flow management actuator 240).

With reference to FIG. 2D the safety valve 200 is illustrated in a second closed position. In the second closed position, the translating sleeve 222 may be displaced from the first position to a second position, which is relatively closer in proximity to the valve closure mechanism 204. The flow tube main body 208 may remain in the first position, or alternatively only slightly downhole from the first position. When the safety valve 200 is in the second closed position, both the power spring 210 and the nose spring 212 may be in a compressed state.

To move the translating sleeve 222 to the second position, differential pressure across the valve closure mechanism 204 may be increased by lowering the pressure in the conduit 206 or increasing pressure in the lower section 202. Lowering pressure in the conduit 206 or increasing pressure in the lower section 202 may cause fluid from the lower section 202 to flow through the channel 228 defined between the sleeve 226 and the outer housing 224 into the orifice 242. The orifice 242 may allow fluid communication into the piston tube 244, whereby fluid pressure may act on the proximal end of the piston 220. The force exerted by fluid pressure on the proximal end of the piston 220 may displace the piston 220 towards the valve closure mechanism 204 by transferring the force through the piston 220, the translating sleeve assembly 230, and the translating sleeve shoulder 218. The nose spring 212 may provide a spring force against the flow tube shoulder 232 and the translating sleeve assembly 230, and the power spring 210 may provide a spring force against the translating sleeve shoulder 218 and the lower valve assembly 216.

Although not illustrated in FIGS. 2A through 2F, the flow tube main body 208 may include channels that allow pressure and/or fluid communication between the flow path 214 and an interior of the sleeve 226. Collectively the spring forces from the power spring 210 and the nose spring 212 may resist the movement of the piston 220 until the differential pressure across the valve closure mechanism 204 is increased beyond the spring force provided from the power spring 210 and the nose spring 212. Increasing differential pressure may include decreasing pressure in the conduit 206 such that the pressure in the lower section 202 is relatively higher than the pressure in the conduit 206. When the differential pressure across the valve closure mechanism 204 is increased, the differential pressure across the piston 220 also increases. When the differential pressure across the valve closure mechanism 204 is increased beyond the spring force provided by the nose spring 212 and the power spring 210, the nose spring 212 and the power spring 210 may compress and allow the translating sleeve 222 to move into the second position. Differential pressure across the valve closure mechanism 204 may be increased by pumping fluid out of the conduit 206, for example. In the instance that the lower section 202 is fluidically coupled to a non-perforated section of pipe or where there is a plug in a conduit 206 fluidically coupled to the lower section 202 that prevents pressure being transmitted from the lower section 202 to the piston 220, a pressure differential across the valve closure mechanism 204 may be induced through pipe swell.

In the second closed position, the safety valve 200 remains safe as no fluids from the lower section 202 can flow into the flow path 214. In the second closed position there is no amount of differential pressure across the valve closure mechanism 204, the differential pressure being relatively higher pressure in the lower section 202 and relatively lower pressure in the conduit 206, should cause the valve closure mechanism 204 to open to allow fluids from the lower section 202 to flow into the flow path 214, as the pressure from the lower section 202 is acting on the valve closure mechanism 204. If pressure is increased in the conduit 206, the differential pressure across the valve closure mechanism 204 decreases and the translating sleeve 222 may move back to the first position illustrated in FIGS. 2A through 2C. Unlike conventional safety valves that generally require a control line to supply pressure to actuate a piston to move a translating sleeve, the safety valve 200 may only require pressure supplied by the wellbore fluids in the lower section 202 to move the translating sleeve.

With continued reference to FIG. 2D, the piston 220 may be fixedly attached to the translating sleeve assembly 230. Although illustrated as a single piston in FIGS. 2A through 2F, the piston 220 may comprise a plurality of pistons and remain within the scope of the disclosure. As the sliding sleeve 252 and the mechanical connecting apparatus 272 are rigidly fixed together, and the mechanical connecting apparatus 272 is rigidly fixed to the bore flow management actuator 240 (e.g., translating sleeve 222 of the bore flow management actuator 240), any movement of the translating sleeve 222 also moves the mechanical connecting apparatus 272 and the sliding sleeve 252. As shown in FIG. 2D, this movement may align the electromagnetic assembly 254 and the magnetic target 256.

Before, during or after the translating sleeve 222 is allowed to come to the second position as described above and shown in FIG. 2D, the electromagnetic assembly 254 may be powered on. Powering the electromagnetic assembly 254 may cause the electromagnetic assembly 254 to magnetically fix with the magnetic target 256 to hold the sliding sleeve 252 of the first portion 250 in its axial downhole position.

In FIGS. 2A through 2F, the electromagnetic assembly 254 is depicted as one coil circumscribing the tubular, but there may be any number of coils in any orientation to fix the sliding sleeve 252, and thus bore flow management actuator 240 in place. The electromagnetic assembly 254 may apply a force in a substantially radial or axial direction, for example. The force applied by the electromagnetic assembly 254 may be any amount of force, including but not limited to, a force in a range of about 45 Newtons to about 45000 Newtons. The electromagnetic assembly 254 may provide a means to hold the sliding sleeve 252 and the bore flow management actuator 240 at any well depth. Hydraulic systems used in previous wellbore safety valves generally require control and balance lines to actuate and hold a valve open which may have pressure limitations. The limitations experienced by hydraulic systems may be overcome by using the electromagnetic assembly 254 described herein, as only well pressure is required to open the safety valve 200. Again, when the translating sleeve 222 is in the second position either when the electromagnetic assembly 254 is switched on or switched off, no amount of differential pressure across the valve closure mechanism 204 will open the valve closure mechanism 204, the differential pressure being a pressure difference between a relatively higher pressure in the section 202 and a relatively lower pressure in the conduit 206.

With reference to FIG. 2E, the safety valve 200 is illustrated in an open position. When the safety valve 200 is in the open position, the translating sleeve 222 may be fixed in place in the second position, as in FIGS. 2D and 2E, through the force provided by the electromagnetic assembly 254, the force being transferred through the mechanical connecting apparatus 272 to the bore flow management actuator 240, for example via the translating sleeve 222. The flow tube main body 208 is illustrated as being axially shifted from the first position illustrated in FIGS. 2A through 2D to a second position in FIG. 2E. When the flow tube main body 208 is in the second position, the flow tube shoulder 232 and the translating sleeve shoulder 218 may be in contact and the flow tube main body 208 may have displaced the valve closure mechanism 204 into an open position. The nose spring 212 may be in an uncompressed state, while the power spring 210 may be in a compressed state.

The flow tube main body 208 may be moved from the first position to the second position when the translating sleeve 222 is fixed in place in the second position by the electromagnetic assembly 254, as described above. When the translating sleeve 222 is fixed in the second position through the force provided by the electromagnetic assembly 254, the nose spring 212 may provide a positive spring force against the flow tube shoulder 232 and the translating sleeve assembly 230. The positive spring force from the nose spring 212 may be transferred through the flow tube main body 208 into the valve closure mechanism 204. The flow tube main body 208 will not move to the second position until differential pressure across the valve closure mechanism 204 exists and the translating sleeve 222 is fixed in position. The differential pressure may be decreased by pumping into the conduit 206, thereby increasing the pressure in the conduit 206. The pressure may be increased in the conduit 206 until the differential pressure across the valve closure mechanism 204 is decreased to a point where the positive spring force from the nose spring 212 is greater than the differential pressure across the valve closure mechanism 204. Thereafter, the nose spring 212 may extend and move the flow tube main body 208 into the second position by acting on the translating sleeve assembly 230 and the flow tube shoulder 232, which are held in place via the electromagnetic assembly 254 and one or more other features. When the flow tube main body 208 is in the second position, fluids such as oil and gas in the lower section 202 may be able to flow into the flow path 214 and to a surface of the wellbore such as to a wellhead. Safety valve 200 may remain in the open position defined by the translating sleeve 222 being in the second position and the flow tube main body 208 being in the second position, as long as the electromagnetic assembly 254 remains powered on.

The safety valve 200 may be moved back to the first closed position, as illustrated in FIG. 2F, by powering off the electromagnetic assembly 254. As previously discussed, the electromagnetic assembly 254 may fix the sliding sleeve 252 and the flow tube main body 208 in place in the second position when the electromagnetic assembly 254 remains powered on. When the electromagnetic assembly 254 is powered off, the sliding sleeve 252 and the flow tube main body 208 may no longer be fixed in place. The power spring 210 may provide a positive spring force against the lower valve assembly 216, translating the sleeve shoulder 218 and the flow tube shoulder 232 uphole. The positive spring force from the power spring 210 may axially displace the translating sleeve 222 to the first position and the flow tube main body 208 to the first position, thereby returning the safety valve 200 to the first closed position illustrated in FIGS. 2A through 2C, and 2F. The positive spring force from the power spring 210 may also axially displace the electromagnetic assembly 254 to the position illustrated in FIGS. 2A through 2C, and 2F, by transmitting the positive spring force through the mechanical connecting apparatus 272.

In the embodiment of FIGS. 2A through 2F, the safety valve 200 further includes one or more permanent magnets 280 coupled to one or more actuatable (e.g., movable) features of the safety valve 200. In the illustrated embodiment of FIGS. 2A through 2F, a first permanent magnet **285*a* is coupled with the flow tube main body 208, and a second permanent magnet 285*b* is coupled with the valve closure mechanism 204 (e.g., flapper valve, ball valve, etc.). In the illustrated embodiment of FIGS. 2A through 2F, the safety valve 200 further includes one or more magnetic field sensors 290. In the illustrated embodiment of FIGS. 2A through 2F, a first magnetic field sensor 295*a* is placed proximate (e.g., placed radially about) the first permanent magnet 285*a*, and a second magnetic field sensor 295*b* is placed proximate (e.g., placed radially about) the second permanent magnet 285*b***.

In this embodiment, the first magnetic field sensor **295*a* is configured to measure one or more aspects of a movement of the flow tube main body 208, and send that information uphole using one or more communication lines 298 (e.g., TEC lines). In this embodiment, the second magnetic field sensor 295*b* is configured to measure one or more aspect of a movement of the valve closure mechanism 204 (e.g., flapper valve, ball valve, etc.), and send that information uphole using one or more communication lines 298 (e.g., TEC lines). While the embodiment of FIGS. 2A through 2F only place the one or more permanent magnets on the flow tube main body 208 and the valve closure mechanism 204, other embodiments exist wherein one or more other permanent magnets are coupled to other movable features of the safety valve 200. In at least one embodiment, a power and/or communication interface 299 exists between the one or more magnetic field sensors 290 and the one or more communications lines 298**.

Figure 3A:
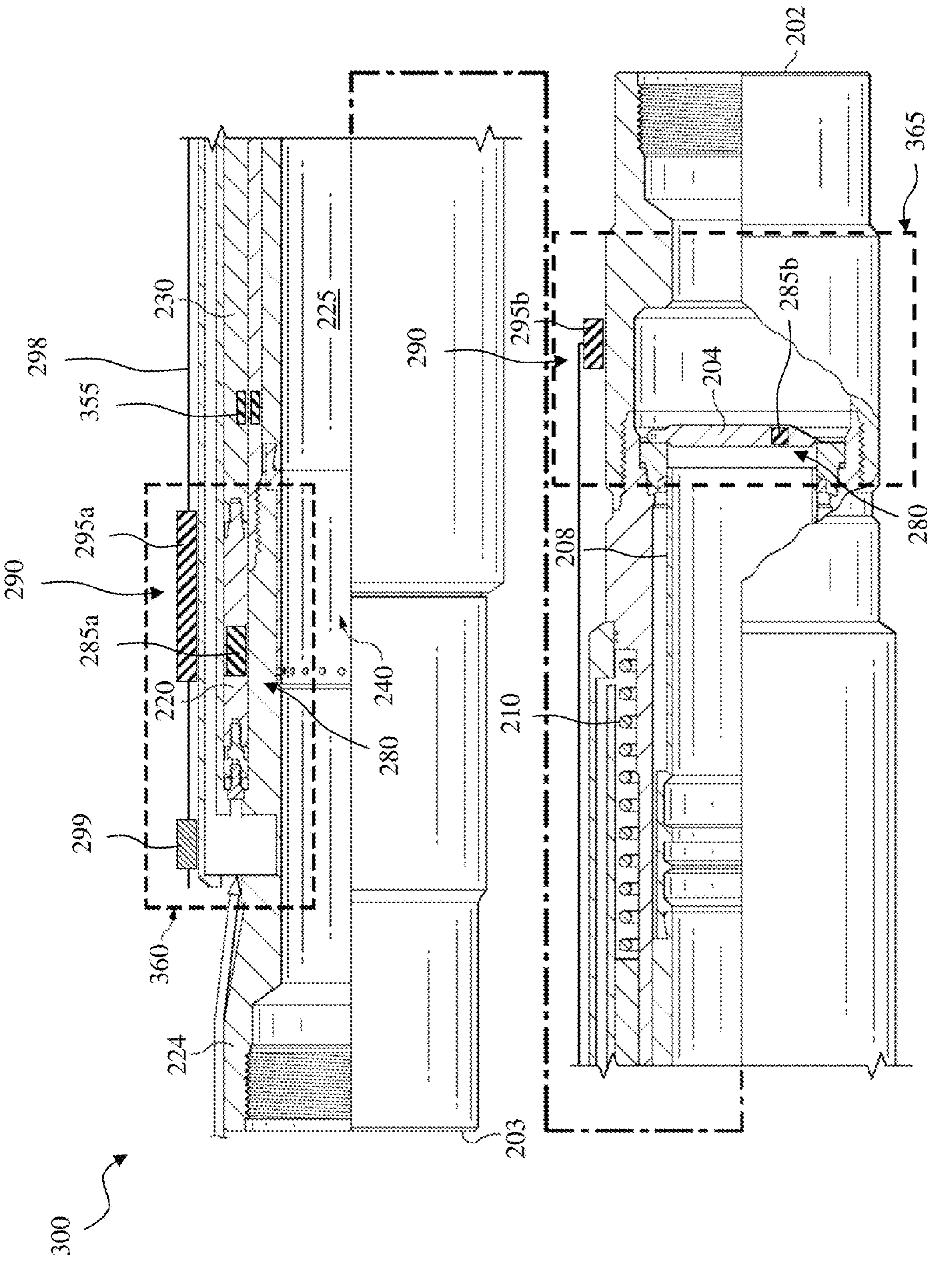
FIGS. 3A and 3B illustrate one embodiment of a downhole device, including a safety valve designed, manufactured and/or operated according to one or more alternative embodiments of the disclosure.
Figure 3B:
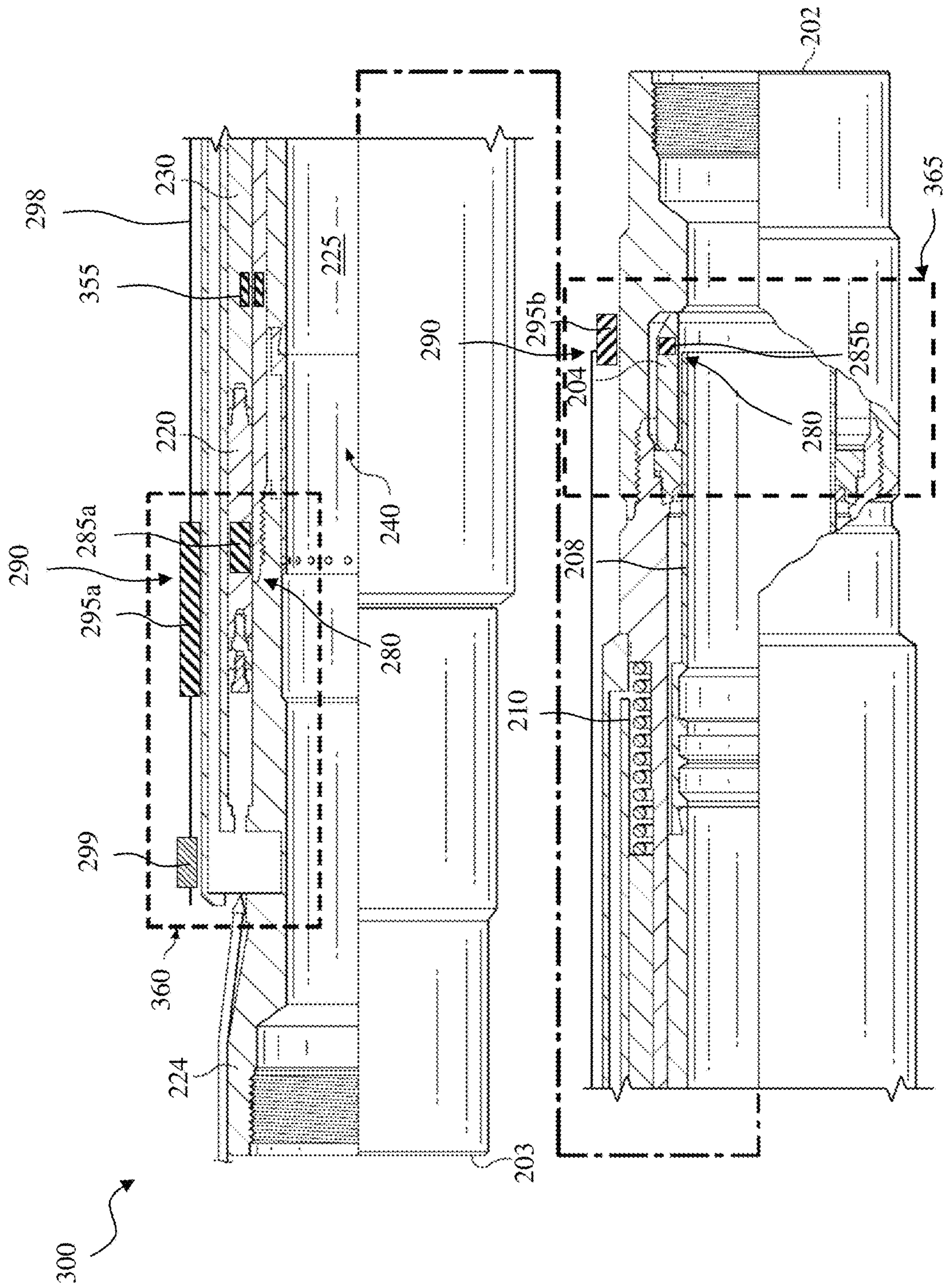

Turning now to FIGS. 3A and 3B, illustrated is one embodiment of a safety valve 300 designed and manufactured according to one or more alternative embodiments of the present disclosure, in a closed state and an open state, respectively. The safety valve 300 of FIGS. 3A and 3B is similar in many respects to the safety valve 200 of FIGS. 2A through 2F. Accordingly, like reference numbers have been used to indicate similar, if not identical, features. The safety valve 300, in the embodiment of FIGS. 3A and 3B, includes an outer housing 224 (e.g., tubular housing). The outer housing 224 in the illustrated embodiment includes a central bore 225 extending there through, the central bore 225 operable to convey subsurface production fluids from a subterranean formation. The central bore 225, in the illustrated embodiment, includes a lower section 202 and an upper section 203.

The safety valve 300, in one or more embodiments, additionally includes a valve closure mechanism 204 disposed proximate the lower section 202 of the central bore 225. The valve closure mechanism 204 may isolate the lower section 202 of the central bore 225 from the upper section 203, which may prevent formation fluids and pressure from flowing through the safety valve 300 when the valve closure mechanism 204 is in a closed position. The valve closure mechanism 204 may be any type of valve such as a flapper type valve or a ball type valve, among others. FIG. 3A illustrates the valve closure mechanism 204 as being a flapper type valve in the closed position, whereas FIG. 3B illustrates the valve closure mechanism 204 as being a flapper type valve in the open position.

The safety valve 300 additionally includes a bore flow management actuator 240, for example including a flow tube main body 208, disposed in the central bore 225. The flow tube main body 208, in the illustrated embodiment, is configured to move between a retracted state (e.g., as shown in FIG. 3A) and a deployed state (e.g., as shown in FIG. 3B) to engage or disengage the valve closure mechanism 204. Accordingly, the flow tube main body 208 may determine a flow condition of subsurface production fluids through the central bore 225, simply by moving between the retracted state and the deployed state. The safety valve 300 may additionally include a power spring 210, the power spring 210 configured to return the flow tube main body 208 to the retracted state when needed.

The safety valve 300 additionally includes a translating sleeve assembly 230 (e.g., hydraulically controlled translating sleeve assembly) coupled to the flow tube main body 208. The translating sleeve assembly 230, which is illustrated in FIGS. 3A and 3B as including a piston 220, may linearly move, which in turn moves the flow tube main body 208 between the retracted state and the deployed state (e.g., engaging the valve closure mechanism 204 to move it to the open position). In the embodiment of FIGS. 3A and 3B, the translating sleeve assembly 230 and the flow tube main body 208 are coupled using one or more magnets 355. Thus, as the translating sleeve assembly 230 moves downhole it magnetically moves the flow tube main body 208 downhole. In other embodiments, however, the translating sleeve assembly 230 physically contacts the flow tube main body 208, thus having the same effect as the magnetic connection.

The safety valve 300 illustrated in FIGS. 3A and 3B additionally includes one or more health/safety components 360, 365, the one or more health/safety components 360, 365 configured to help in determining and/or measuring the health of the safety valve 300. In the embodiment of FIGS. 3A and 3B, the health/safety components 360, 365 each include one or more permanent magnets 280 coupled to one or more actuatable (e.g., movable) features of the safety valve 300. In the illustrated embodiment of FIGS. 3A and 3B, the health/safety components 360, 365 include a first permanent magnet 285*a* coupled with the flow tube main body 208, and a second permanent magnet 285*b* coupled with the valve closure mechanism 204 (e.g., flapper valve, ball valve, etc.). In the illustrated embodiment of FIGS. 3A and 3B, the health/safety components 360, 365 further include one or more magnetic field sensors 290 (e.g., one or more magnetic amplitude sensors). In the illustrated embodiment of FIGS. 3A and 3B, a first magnetic field sensor 295*a* is placed proximate (e.g., radially about) the first permanent magnet 285*a*, and a second magnetic field sensor 295*b* is placed proximate (e.g., radially about) the second permanent magnet 285*b*.

In this embodiment, the first magnetic field sensor 295*a* is configured to measure one or more aspects of a movement of the flow tube main body 208 (e.g., via movement of the first permanent magnet 285*a*), and send that information uphole using one or more communication lines 298 (e.g., TEC lines). In this embodiment, the second magnetic field sensor 295*b* is configured to measure one or more aspect of a movement of the valve closure mechanism 204 (e.g., flapper valve, ball valve, etc.) (e.g., via movement of the second permanent magnet 285*b*), and send that information uphole using the one or more communication lines 298 (e.g., TEC lines). While the embodiment of FIGS. 3A and 3B has only placed the one or more permanent magnets 280 on the flow tube main body 208 and the valve closure mechanism 204, other embodiments exist wherein one or more permanent magnets 280 are coupled to other movable features of the safety valve 300. In at least one embodiment, a power and/or communication interface 299 exists between the one or more magnetic field sensors 290 and the one or more communication lines 298. While the embodiment illustrated employs a first permanent magnet 285*a* and first magnetic field sensor 295*a*, as well as a second permanent magnet 285*b* and second magnetic field sensor 295*b*, they need not be used together and can be used independent of one another.

Turning to FIGS. 4A through 4C, illustrated are graphs 400*a*, 400*b*, 400*c* showing ideal measurements of the flow tube main body position/velocity/acceleration versus time (e.g., FIG. 4A), actual measurement of the flow tube main body position/velocity/acceleration versus time (e.g., FIG. 4B), and a comparison of the ideal measurements of the flow tube main body position/velocity/acceleration versus time and the actual measurement of the flow tube main body position/velocity/acceleration versus time (e.g., FIG. 4C). This comparison may provide significant information that me be used to determine a health of the safety valve (e.g., in one embodiment the flow tube main body 208 of the safety valve 200, or the flow tube main body 208 of the safety valve 300). Similar graphs could be obtained for the valve closure mechanism 204 of the safety valve 200, or the valve closure mechanism 204 of the safety valve 300, or for that matter any other movable feature that includes a permanent magnet.

The graphs of FIGS. 4A through 4C illustrate the idea of a comparison of the expected measurements of the flow tube main body position/velocity/acceleration versus time and actual measurement of the flow tube main body position/velocity/acceleration versus time. In many situations, the same could be achieved by 1) making a position measurement of a feature; 2) determining how the position/velocity/acceleration varies with time; 3) comparing what was determined to an expected position/velocity/acceleration versus time; and 4) estimating a state of health of the safety valve based on the variance between the measured value and the expected value.

Figure 5A:
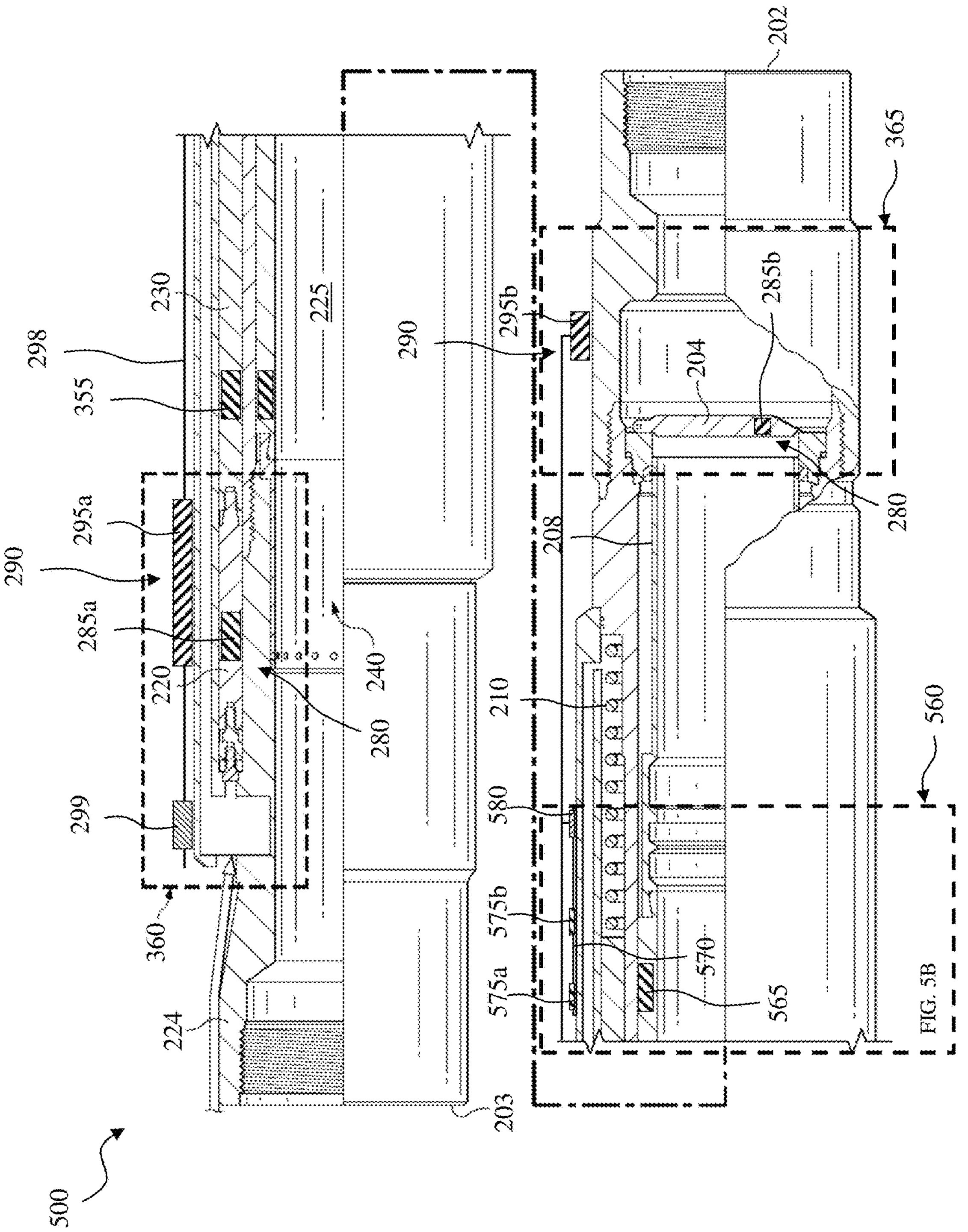
Figure 5B:
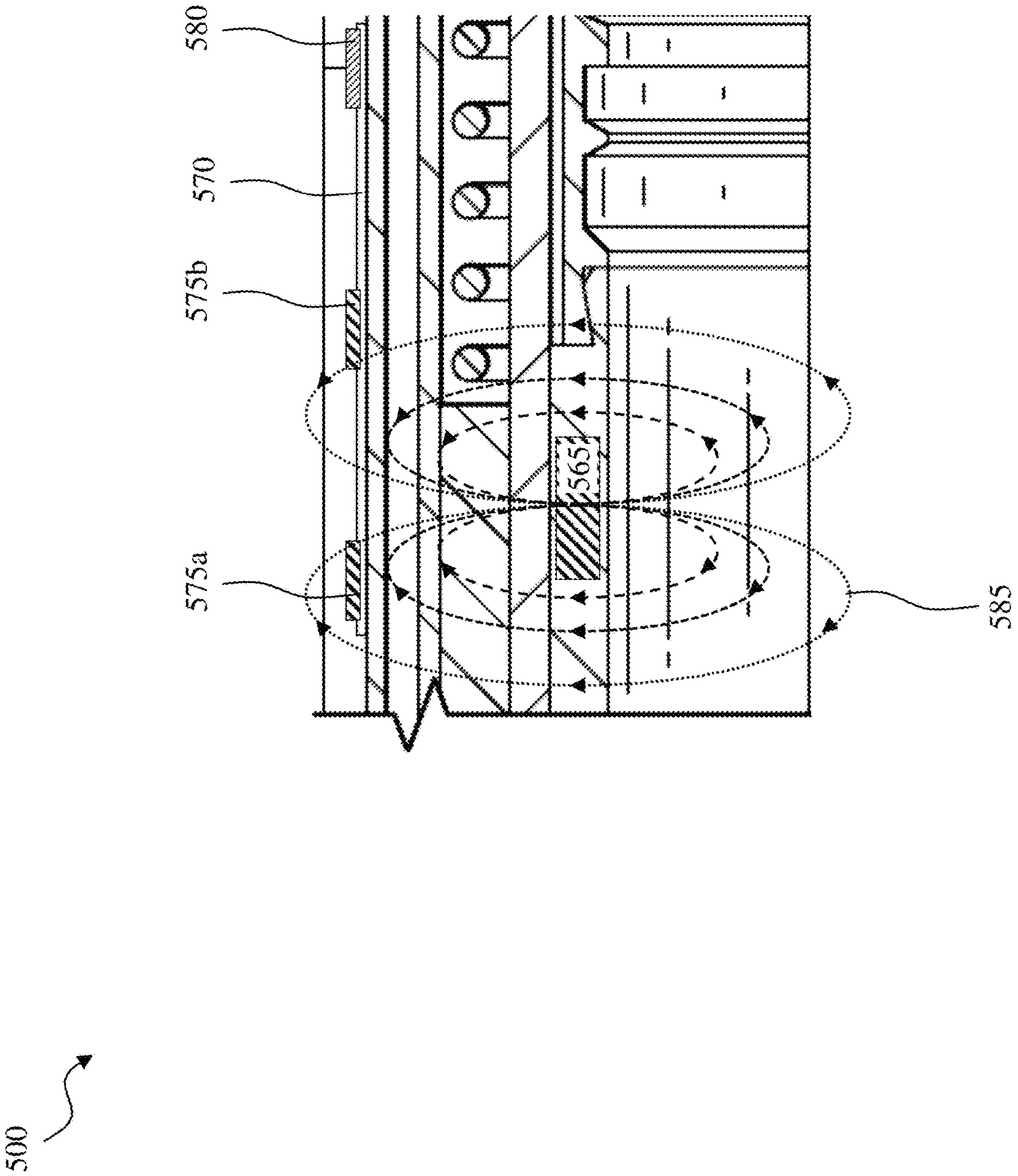
Figure 5C:
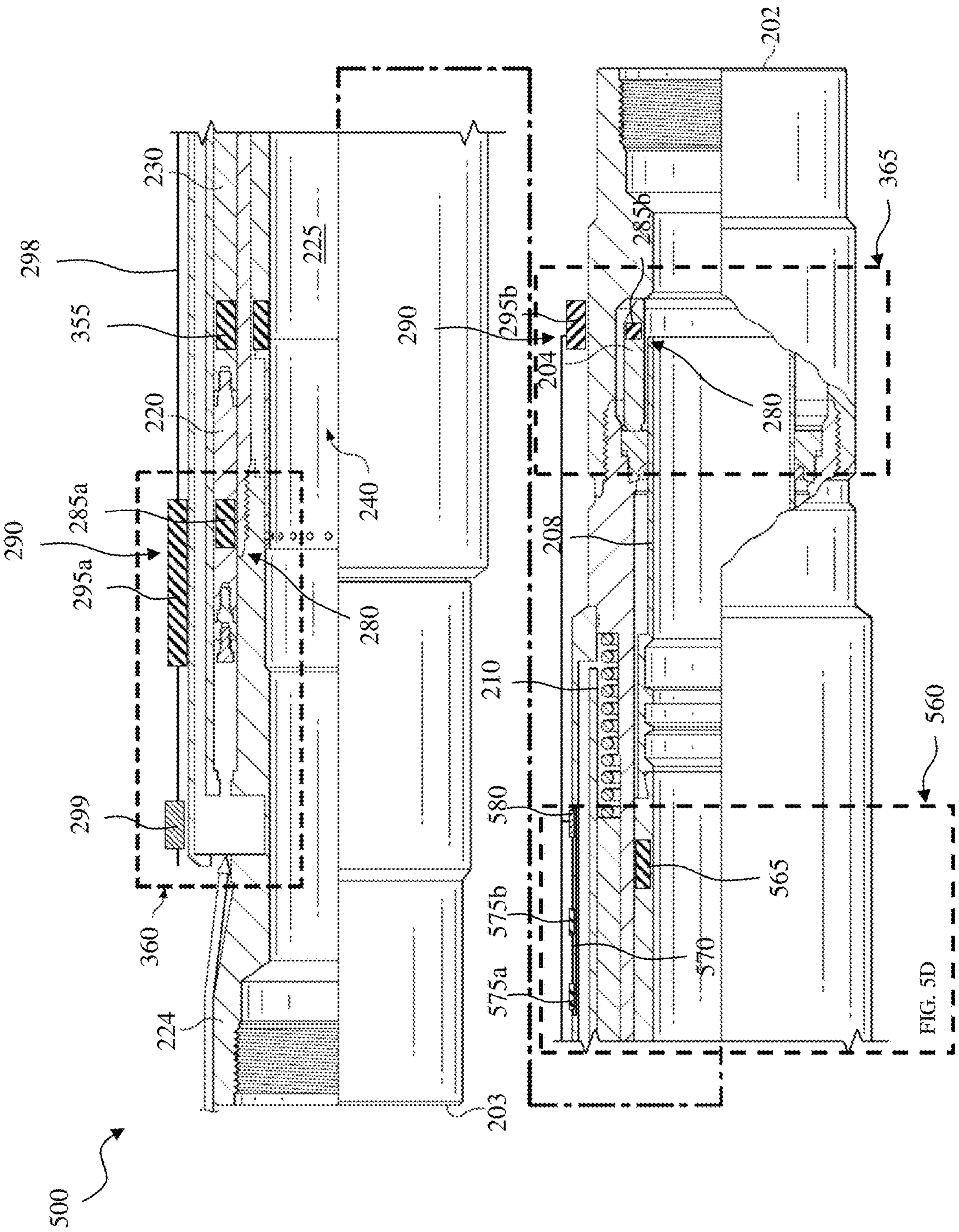
Figure 5D:
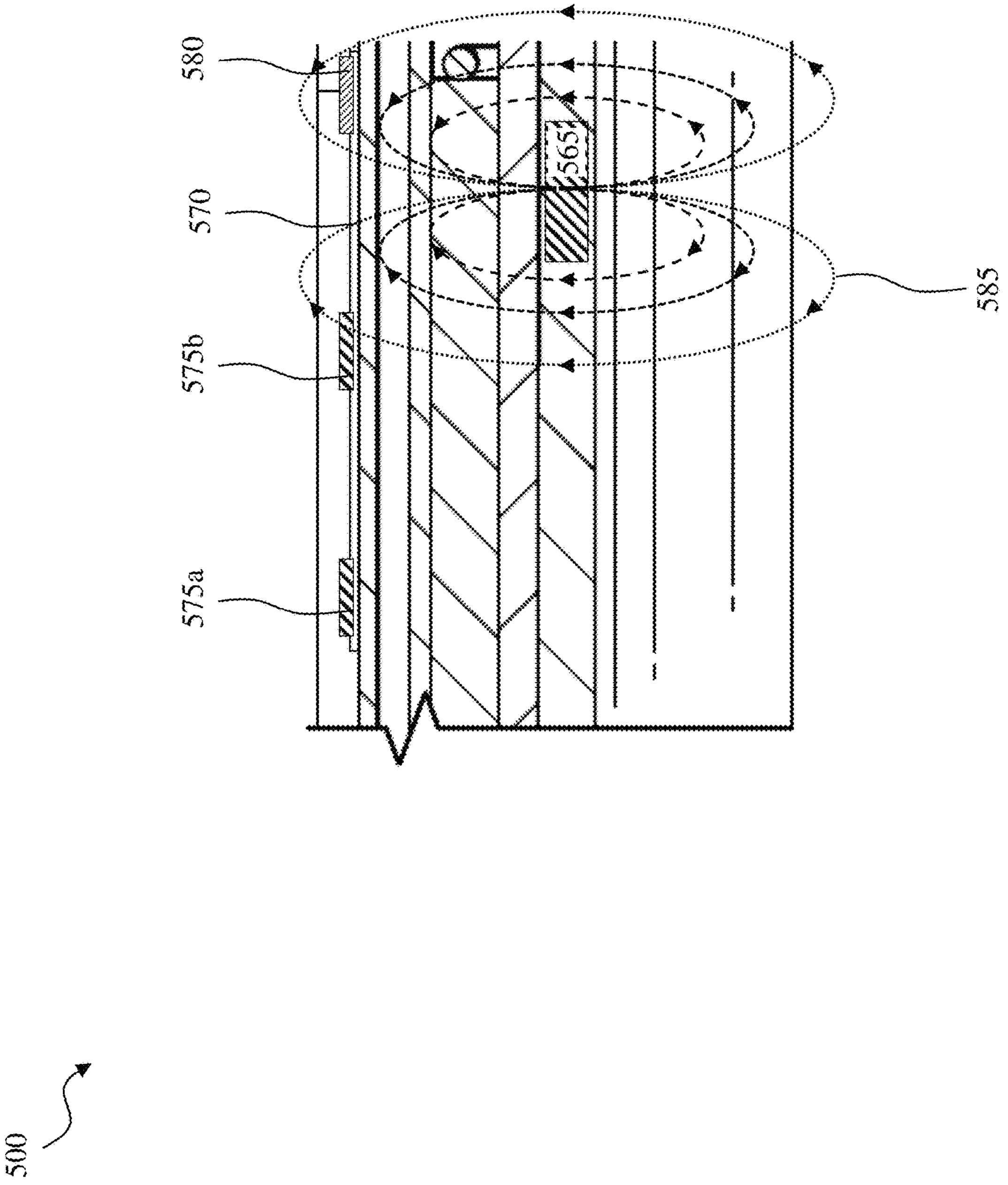

Turning now to FIG. 5A through 5D, illustrated is one embodiment of a safety valve 500 designed and manufactured according to one or more alternative embodiments of the present disclosure, in a closed state (e.g., FIGS. 5A and 5B) and an open state (e.g., FIGS. 5C and 5D). The safety valve 500 is similar in many respects to the safety valve 300 of FIGS. 3A and 3B, and for that matter the safety valve 200 of FIGS. 2A through 2F. Accordingly, like reference numbers have been used to indicate similar, if not identical, features.

In the embodiment of FIGS. 5A through 5D, the safety valve 500 includes another health/safety component 560 that is configured to measure a position/velocity/acceleration, etc. of a moving component of the safety valve 500. In the embodiment of FIGS. 5A through 5D, the health/safety component 560 employs a permanent magnet and a series of magnetic field angle sensors to measure the position/velocity/acceleration, etc. of a moving component of the safety valve 500. In the illustrated embodiment of FIGS. 5A through 5D, a permanent magnet 565 is attached to the bore flow management actuator 240, for example the flow tube main body 208, of the safety valve 500. In at least one embodiment, a series of magnetic field angle sensors 575 are coupled proximate the permanent magnet 565, for example using a circuit board 570 (e.g., a single sensor board chip). In the embodiment of FIGS. 5A through 5D, the series of magnetic field angle sensors 575, and thus the circuit board 570, are positioned on the outside of the outer housing 224. In yet another embodiment, the safety valve 500 does not include the circuit board 570, but includes a plurality of discrete magnetic field angle sensors 575.

The number of magnetic field angle sensors 575 may vary greatly and remain within the scope of the disclosure. In the embodiment of FIGS. 5A through 5D, the safety valve 500 includes two magnetic field angle sensors 575*a*, 575*b*. In yet another embodiment, the safety valve 500 might include just a single magnetic field angle sensor 575, or in even yet another embodiment (e.g., an embodiment wherein greater clarity and detail is required) the safety valve 500 could include at least 3, if not at least 4, if not at least 5, if not at least 6, if not at least 8, if not at least 10, if not at least 15, or more, magnetic field angle sensors 575.

In the embodiment of FIGS. 5A through 5D, the safety valve 500 additionally includes a controller 580 coupled to the one or more magnetic field angle sensors 575. The controller 580, in one or more embodiments, is configured to convert angle measurements (e.g., measured using the series of magnetic field angle sensors 575) into position/velocity/acceleration, etc., among other measurements. The controller 580, in the illustrated embodiment, is positioned on the circuit board 570, yet in other embodiments the controller 580 is not located on the circuit board 570.

In the embodiment of FIGS. 5A through 5D, the permanent magnet 565 generates a magnetic field 585. The magnetic field 585, in one or more embodiments, is configured so that the north-south axis of the permanent magnet 565 is in the direction of the series of magnetic field angle sensors 575 (as shown). While illustrated this way, the permanent magnet 565 could be oriented in other directions as well. The angle of the magnetic field 585 varies with the distance away from the permanent magnet 565. The series of magnetic field angle sensors 575 measure the angle of the magnetic field 585. Accordingly, by knowing the angle of the magnetic field 585, the user can calculate a distance between the series of magnetic field angle sensors 575 and the permanent magnet 565. Accordingly, in at least this embodiment, the user can know a position of the flow tube main body 208 in the safety valve 500.

As shown in FIGS. 5B and 5D, the sensor 575*a* measures a magnetic angle of $X_1$ (e.g., +70 degrees in one embodiment), and the sensor 575*b* measures a magnetic angle of $X_2$ (e.g., −20 degrees in one embodiment). Advantageously, the angles measured by the series of magnetic field angle sensors 575 are very sensitive to a small movement of the permanent magnet 565. Experiments have shown that measuring the angle is a much more precise measurement than measuring the amplitude of the magnetic field alone, for example as conducted in the embodiment of FIGS. 2A through 2F and 3A and 3B.

Accordingly, in at least one embodiment, a single measurement from sensor 575*a* may be used to determine a position of the flow tube main body 208 component within the safety valve 500. Additionally, a time rate of change of the measurements from sensor 575*a* may be used to estimate the health of the components within the safety valve 500. Moreover, when the permanent magnet 565 is closer to sensor 575*b*, then the angle values from sensor 575*b* may be used rather than from sensor 575*a*, thus providing greater clarity to its position. The choice of the sensor to be used (e.g., sensor 575*a*, 575*b*) may be determined from the angle of the measured magnetic field.

A position algorithm, for example in controller 580 may then use the magnetic angle measurements from sensors 575*a* and 575*b*. Using multiple measurements allows for reducing the error in the position estimation, especially the error from hysteresis. The position algorithm, in one or more embodiments, may apply a weighting to the multiple sensor measurements and thus may give a greater weight to the sensor 575 that is closer to the permanent magnet 565 and a smaller weight to the sensor 575 that is farther from the permanent magnet 565. Alternatively, the position algorithm may use the magnetic angle measurement from a single sensor.

The magnetic angle measurement can be calculated by measuring the magnitude of the directional magnetic field in two directions (axial and radial for FIGS. 5A and 5B) and then looking at the ratio of the two magnitude measurements. The ratio of the two magnitude measurements is a mathematical calculation, such as an algebraic calculation such as division or a geometric calculation such as a tangent or cotangent estimation.

Feedback of the position of the movable features (e.g., flow tube main body 208, valve closure mechanism 204, etc.) would allow a user to specify the degree of movement (e.g., opening) of the movable feature. For example, aspects of the present disclosure may be used (e.g., as discussed above with regard to FIGS. 5A and 5B) with one or more safety valves (e.g., sub-surface safety valves (SSSVs), tubing retrievable safety valves (TRSVs), wireline retrievable safety valves (WLRSVs), barrier valves, etc.). Knowing the exact position of the movable feature of the SSSVs, TRSVs, WLRSVs, and barrier valves (FS-2 valve) would assure the operator that such valves are completely open or completely closed. Being completely open is important to ensure that there is no restriction to production flow (e.g., barrier valve) as well as is important to ensure that there are no valve lips that could catch a tool string (e.g., TRSV). Being completely closed is important to ensure that the valve is sealing, such as in an SSSV.

Additionally, the velocity at which the movable feature (e.g., flow tube main body 208, valve closure mechanism 204, etc.) opens and/or closes over time reflects the built-up of debris in the path of the movable feature. Knowing the velocity of movable feature facilitates the qualitative estimation of debris built, such that predictive maintenance of the safety valve can be carried out.

While the embodiment of FIGS. 5A through 5D focuses on the permanent magnet 565 and the magnetic field angle sensors 575*a* and 575*b* to be deployed for the measurement of the position/velocity/acceleration, etc. of the bore flow management actuator 240 (e.g., flow tube main body 208) of the safety valve 500, the present disclosure should not be limited to such. For instance, the permanent magnet 565 and the magnetic field angle sensors 575*a* and 575*b* could be deployed for the measurement of the position/velocity/acceleration, etc. of the valve closure mechanism of the safety valve 500 in another embodiment. In fact, the permanent magnet 565 and the magnetic field angle sensors 575*a* and 575*b* could be deployed for the measurement of the position/velocity/acceleration, etc. of any movable feature of the safety valve 500 and remain within the scope of the disclosure. Additionally, the permanent magnet 565 and the magnetic field angle sensors 575*a* and 575*b* could be deployed along with, or separately from, the permanent magnets 280 and magnetic field sensors 290 of the embodiments of FIGS. 2A through 2F and FIGS. 3A and 3B for the measurement of the position/velocity/acceleration, etc. of any movable feature.

In yet another embodiment, not shown, the inventive aspects of the present disclosure may be used with an interval control valve (ICV), or at least the moving elements thereof. Simple feedback of the position of our ICVs would allow the user to specify the degree of opening of the ICVs in one or more intelligent well completions (e.g., Halliburton's SmartWell® completions). Exactly knowing the amount of opening would allow the user to know exactly the flow restriction.

Turning to FIG. 6, illustrated is one embodiment of an inflow control valve (ICV) 600 designed, manufactured and/or operated according to one or more embodiments of the disclosure, and that may take advantage of the one or more magnetic field sensors (e.g., magnitude or angle based sensors) and one or more permanent magnets described above with respect to the safety valves 200, 300, 500. In at least one embodiment, the inflow control valve (ICV) 600 generally includes a valve body 602 having a fluid flow path 604 defined therethrough extending between fluid ports 606, 608 (e.g., inlet fluid port and outlet fluid port). A power harvesting mechanism 610 may be disposed along the fluid flow path 604. The fluid flow path 604 may be defined by one or more channels or ducts 605 formed in the valve body 602, and may likewise include one or more manifolds 607 interconnecting the one or more channels or ducts 605 and fluid ports 606, 608. In some embodiments, the power harvesting mechanism 610 is a turbine-based generator or vortex-based generator that can be actuated by fluid flow along the fluid flow path 604. In other embodiments, the power harvesting mechanism 610 may be disposed to be actuated by fluid flow external of the valve body 602, such as production flow flowing past the inflow control valve (ICV) 600. Also disposed along the fluid flow path 604 between fluid ports 606, 608, in one or more embodiments, is a movable feature 612 (e.g., adjustable valve) which may be utilized to form a restriction in the channel 605 to control fluid flow along the fluid flow path 604. In one embodiment, the flow port 608 is fluidically connected to the exterior of the tubing and the flow port 606 is fluidically connected to the interior of the tubing. In another embodiment, the fluid flow path 604 is part of the flow path from the exterior of the tubing into the interior of the tubing.

The movable feature 612 (e.g., adjustable valve) is not limited to a particular type of valve, but can be any movable feature 612 (e.g., adjustable valve) known to persons of ordinary skill in the art. While not limiting the foregoing, in some embodiments, the movable feature 612 (e.g., adjustable valve) may be a ball valve, while in other embodiments, the movable feature 612 (e.g., adjustable valve) may be a plunger valve 613, while in still other embodiments, the movable feature 612 (e.g., adjustable valve) may be a flapper valve, while in still other embodiments, the moveable feature 612 (e.g., adjustable valve) may be a sliding valve. In the illustrated embodiment, the movable feature 612 (e.g., adjustable valve) is shown as having a drive mechanism 614 to actuate a movable plunger 615 that can translate linearly to alter the restriction. In other embodiments, the drive mechanism is provided by a shifting tool that is conveyed in the wellbore on wireline, slickline, tubing, or a robot. In any event, the movable feature 612 (e.g., adjustable valve) is generally movable between a first position and a second position so as to adjust flow along the fluid flow path 604. In this regard, a first position may be fully closed and a second position may be open to some degree to allow fluid to flow along the fluid flow path 604. The movable feature 612 (e.g., adjustable valve) may be adjusted to alter flow along the fluid flow path 604 for different operations. For example, the movable feature 612 (e.g., adjustable valve) may be in a fully open position to allow electronic flow control node to be utilized in fluid injection procedures, such as acidizing, hydraulic fracturing, gravel packing and the like. Thereafter, when the movable feature 612 (e.g., adjustable valve) is used for production, flow along the fluid flow path 604 may be decreased by closing the movable feature 612 (e.g., adjustable valve) to form a partial restriction in the channel 605, thus controlling formation fluid flow along the fluid flow path 604.

In at least one embodiment, the movable feature 612 (e.g., adjustable valve) is controlled by a drive mechanism 614, such an electric actuator. The drive mechanism 614 may generally be powered by power harvesting mechanism 610 controlled by control electronics 616. Control electronics 616, in one or more embodiments, include a wireless transmitter 618 for receiving wireless control signals as described herein. As used herein, the wireless transmitter is meant to be any device that can receive a wireless signal and/or transmit a wireless signal, and is not limited to a particular type of wireless signal. In one or more embodiments, the power harvesting mechanism 610, movable feature 612 (e.g., adjustable valve), drive mechanism 614, and control electronics 616 are all carried on the valve body 602 or otherwise packaged therewith. In one or more embodiments, the wireless transmitter 618 may be further disposed for transmitting wireless signals from a sensor 620 disposed to measure an environmental condition adjacent to the inflow control valve (ICV) 600. Without limiting the disclosure, sensor 620 may be a temperature sensor, a pressure sensor, a flow sensor, or an optic sensor. In one or more embodiments, the sensor 620 likewise may be carried on the valve body 602, while in other embodiments, the sensor 620 may be separate from the valve body 602. In one or more embodiments, the sensor 620 allows conditions around inflow control valve (ICV) 600 to be monitored and wirelessly transmitted to a controller, thereby permitting adjustment of the movable feature 612 (e.g., adjustable valve) as desired based on the measured conditions by the sensor 620. In some embodiments, the valve body 602 may be a sleeve shape (e.g., as shown in FIG. 6) while in other embodiments, the valve body 602 may have a smaller profile. In some embodiments, the valve body 602 may have a fluid flow path 604 with multiple fluid ports 606 and/or multiple fluid ports 608. In yet another embodiment, inflow control valve (ICV) 600 may have two flow paths defined therein and interconnecting with the fluid port 606, each of the flow paths terminating in a fluid port 608 so that flow to one or the other of fluid ports 608 may be selectively determined by the movable feature 612 (e.g., adjustable valve).

In one or more embodiments, the inflow control valve (ICV) 600 may additionally include one or more permanent magnets 680 coupled to one of a movable feature thereof or a fixed feature thereof, as well as one or more magnetic field sensors 690 coupled to one of the fixed feature or the movable feature and positioned proximate the one or more permanent magnets 680. In at least this one embodiment, the one or more magnetic field sensors 690 are configured to sense a movement of a movable feature of the inflow control valve (ICV) 600, such as the movable feature 612 (e.g., adjustable valve), to determine a health and/or safety of the inflow control valve (ICV) 600. The one or more permanent magnets 680 and magnetic field sensors 690 may be designed, manufactured and/or operated according to this disclosure, and specifically in a similar manner as those disclosed herein with regard to the safety valves 200, 300, 500. For example, the magnetic field sensors 690 may measure a magnitude and/or angle of the magnetic field to determine a position/velocity/acceleration (e.g., versus time) of the movable feature of the inflow control valve (ICV) 600, such as the movable feature 612 (e.g., adjustable valve). The magnetic field sensors 690 may also help determine the force necessary to move the movable feature of the inflow control valve (ICV) 600, such as the movable feature 612 (e.g., adjustable valve), and thus determine the health and/or safety of the drive mechanism 614.

FIGS. 7A and 7B illustrate cross-sectional views of embodiments of a lower completion assembly 700 with one or more inflow control valves (ICVs) 600 as described in FIG. 6. Lower completion assembly 700 is generally comprised of at least one sand screen assembly 710. Sand screen assembly 710 has a base pipe 712 extending between a first end 714 and a second end 716 and defining an interior flow passage 718 therein. Base pipe 712 further includes at least one opening 720 extending through a sidewall thickness of the base pipe 712 and having a cross-sectional opening area A1. In other embodiments, base pipe 712 may include multiple openings. A sand screen 722 is disposed around a portion of the base pipe 712 and forms one or more sand screen flow paths 724 between the sand screen 722 and the base pipe 712. Sand screen 722 can be any filter media known in the industry and is not intended to be limited by the disclosure. In one embodiment, the sand screen assembly 710 may include two or more sand screens 722 deployed along base pipe 712, such as is illustrated as sand screens 722*a* and 722*b*. Although sand screen 722 is illustrated as spaced apart from opening 720, opening 720 may also be adjacent the sand screen 722. Sand screen assembly 710 may further include an inflow control valve (ICV) 600. As described above, inflow control valve (ICV) 600 may include at least one movable feature 612 (e.g., adjustable valve), but may include two or more movable features 612 (e.g., adjustable valve). Alternatively, as needed, rather than multiple movable features 612 (e.g., adjustable valve) in a single inflow control valve (ICV) 600, multiple inflow control valves (ICVs) 600 may be utilized as needed.

In any event, FIG. 7A illustrates an inflow control valve (ICV) 600 with a single movable feature 612 (e.g., adjustable valve), while FIG. 7B illustrates that multiple inflow control valves (ICVs) 600 may be employed, namely a first inflow control valve (ICV) 600*a* and a second inflow control valve (ICV) 600*b*. The movable feature 612 (e.g., adjustable valve) is not limited to a particular type of valve, but can be any valve known to persons of ordinary skill in the art. While not limiting the foregoing, in some embodiments, the movable feature 612 (e.g., adjustable valve) may be a ball valve, while in other embodiments, the movable feature 612 (e.g., adjustable valve) may be a plunger valve, while in still other embodiments, the movable feature 612 (e.g., adjustable valve) may be a flapper valve. In the illustrated embodiment, the movable feature 612 (e.g., adjustable valve) is shown as having a drive mechanism 614 in the form of an electric actuator. In the illustrated embodiment, drive mechanism 614 actuates a movable plunger 615 that can translate linearly to alter the restriction. In any event, the movable feature 612 (e.g., adjustable valve) is generally movable between a first position and a second position so as to adjust flow along the fluid flow path 604. In this regard, a first position may be fully closed and a second position may be open to some degree to allow fluid to flow along fluid flow path 604. The movable feature 612 (e.g., adjustable valve) may be adjusted to alter the cross-sectional area of fluid flow path 604, permitting different flow rates for different operations. In one or more embodiments, the inflow control valve (ICV) 600 is deployed along the base pipe 712 and the adjacent opening 720 such that fluid flow path 604 of the inflow control valve (ICV) 600 is in fluid communication with the interior flow passage 718 via aligned fluid port 606 and opening 720.

In the illustrated embodiment, the fluid flow path 604 of inflow control valve (ICV) 600 is also in fluid communication with the sand screen flow paths 724 via fluid port 608. In the case where base pipe 712 includes multiple openings 720, the inflow control valve (ICV) 600 may likewise include multiple fluid ports 606 along the fluid flow path 604. In other embodiments with multiple openings 720 in base pipe 712, such as is shown in FIG. 7B, a separate inflow control valve (ICV) 600 can be deployed for each opening 720. Specifically, as illustrated in FIG. 7B, a first inflow control valve (ICV) 600*a* may communicate with a first opening 720*a* while a second inflow control valve (ICV) 600*b* may communicate with a second opening 720*b*. In such a case, one opening may be used for a first task, such as an injection opening to inject a working fluid into an annulus adjacent a sand screen, while another opening may be used for a second task, such as a production opening to control flow of formation fluid into the base pipe 712. In such embodiments, the cross-sectional areas Ala of the injection opening may be smaller than the cross-sectional area A1b of the production opening. Thus, the fluid flow path 604 restrictions can be adjusted accordingly for the operation with which the inflow control valve (ICV) 600 is used.

In each of FIGS. 7A and 7B, a connecting sleeve 730 is illustrated. The connecting sleeve 730 is generally disposed around a portion of the base pipe 712 and spaced apart therefrom to form a connecting sleeve flow path 732 between the connecting sleeve 730 and the base pipe 712. In the illustrated embodiment of FIGS. 7A and 7B, the inflow control valve (ICV) 600 is spaced apart from and generally positioned along base pipe 712 between two sand screens 722, depicted as screens 722*a* and 722*b*. Connecting sleeve 730 extends between sand screens 722*a*, 722*b* and over inflow control valve (ICV) 600 so that sleeve flow path 732 fluidically couples the sand screen flow paths 724 of sand screens 722*a*, 722*b*. Moreover, the fluid flow path 604 is in fluid communication with the fluidically coupled sand screen flow paths 724 and 732. As such, the inflow control valve (ICV) 600 can be employed to control fluid flow from a plurality of sand screens 722.

In FIGS. 7A and 7B, the sand screen assembly 710 is shown coupled to an additional sand screen assembly 750. In the illustrated embodiment, the sand screen assembly 750 does not include base pipe openings or apertures as does sand screen assembly 710. The sand screen assembly 750 has base pipe 752 that is unperforated extending between a first end 754 and a second end 756 and defining an interior flow passage 758 therein. A sand screen 762 is disposed around a portion of the base pipe 752 and forms a sand screen flow path 764 between the sand screen 762 and the base pipe 752. The sand screen 762 can be any filter media known in the industry and is not intended to be limited by the disclosure. In one embodiment, a sand screen assembly 750 may include two or more sand screens 762 deployed along base pipe 752. As shown, the first end 714 of base pipe 712 is coupled to the second end 756 of base pipe 752 to form a joint 768 therebetween. A connecting sleeve 770 extends between sand screen 722 of the sand screen assembly 710 and sand screen 762 of sand screen assembly 750 so that connecting sleeve 770 spans joint 768 between the sand screen assemblies, thereby forming a connecting sleeve flow path 772 between the connecting sleeve 770 and base pipe 712 and 752 so as to fluidically couple the sand screen flow path 764 with the sand screen flow path 724. In this embodiment, inflow control valve (ICV) 600 can be utilized to control formation fluid flow passing into sand screen assembly 750.

As shown, FIGS. 7A and 7B illustrate that the lower completion assembly 700, and particularly the one or more inflow control valves (ICVs) 600*a*, 600*b*, may include the aforementioned one or more permanent magnets 680 and one or more magnetic field sensors 690. It should be noted that in one or more embodiments the one or more permanent magnets 680 and one or more magnetic field sensors 690 are located on opposite sides of a housing, such as the valve body. In at least one other embodiment, the one or more permanent magnets 680 and one or more magnetic field sensors 690 are located on opposite sides of a pressure containing body. It should also be noted, in one or more embodiments, that the measurements may be made simultaneously with a movement of the movable feature, including making a single dynamic measurement or a series of dynamic measurements. In yet another embodiment, one or more static measurements may be made while the movable feature is static, such as at the end of the actuation event. For example, the one or more static measurements may be used to determine whether an additional movement action is desired and/or required, for example if the valve was moved too far or not enough.

In another version, the permanent magnet is attached to the inflow control valve (ICV) while the actuation and the magnetic sensor is attached to a shifting tool that is run into the wellbore. The shifting tool can be run on a cable, on a wire, on tubing, or on a robot. The shifting tool engages with a feature on the valve, translates the valve, and adjusts the inflow restriction of the valve. As the valve moves, the permanent magnet moves. The magnetic sensor on the shifting tool detects and monitors the movement of the valve.

Accordingly, a health of the safety valves 200, 300, 500 and inflow control valve (ICV) 600 can be estimated, without limitation, by at least one of several methods: 1) Calculating the variation in the actual velocity during a period when the predicted velocity is expected to be constant; 2) Calculating the difference between the predicted motion (position, velocity, acceleration, etc.) versus the measured motion; 3) Calculating the initial motion of the movable feature, such as between T0 and T1, which may serve as a measure of the initial sticking/seizing of the downhole device; 4) Calculating the final motion of the movable feature, such as at T2, which may serve as a measure of the seating of the movable feature in the fully opened or fully closed condition; 5) Calculating the motion over a reduced time frame, such as from T1 to T2, where the initial startup effects from T0 to T1 are considered separately.

In at least one embodiment, measuring the health and safety of the movable feature includes determining the operational state of the movable feature. For example, determining an operational state of the movable feature may include determining whether the movable feature has fully stroked. In yet another embodiment, determining an operational state of the movable feature may include determining whether the movable feature has moved at all. In even yet another embodiment, determining an operational state of the movable feature may include determining an amount of movement that has occurred, among others.

The foregoing health calculations, as well as any other information that can be obtained using the inventive aspects of the present disclosure, may then be used to take one or more health based actions. For example, in at least one embodiment, a user could look at one of the health calculations and determine whether it has exceeded a threshold value. In yet another embodiment, the user could look at how the health calculation has changed over time, or alternatively at a difference between health calculated values. Exceeding a health measure can result in taking a remedial action, such as scheduling/conducting a redress of the wellbore, injecting a cleaning fluid such as acid or a chelating agent, performing a cleaning run such as with a scraper or waterjet, cycling the valve between open/closed position, or scheduling a different time for conducting the next monitoring of the valve, among others.

Aspects disclosed herein include:

A. A safety valve, the safety valve including: 1) an outer housing; 2) a bore flow management actuator disposed within the outer housing; 3) a valve closure mechanism disposed within the outer housing, the bore flow management actuator configured to slide from a first initial state to a first subsequent state to move the valve closure mechanism between a first closed state and a first open state; 4) one or more permanent magnets coupled to one of a movable feature of the safety valve or a fixed feature of the safety valve; and 5) one or more magnetic field sensors coupled to one of the fixed feature of the safety valve or the movable feature of the safety valve and positioned proximate the one or more permanent magnets, the one or more magnetic field sensors configured to sense a movement of the movable feature to determine a health of the safety valve.

B. A well system, the well system including: 1) a wellbore extending through one or more subterranean formations; 2) production tubing disposed in the wellbore; and 3) a safety valve disposed in the wellbore, the safety valve including: a) an outer housing; b) a bore flow management actuator disposed within the outer housing; c) a valve closure mechanism disposed within the outer housing, the bore flow management actuator configured to slide from a first initial state to a first subsequent state to move the valve closure mechanism between a first closed state and a first open state; d) one or more permanent magnets coupled to one of a movable feature of the safety valve or a fixed feature of the safety valve; and 3) one or more magnetic field sensors coupled to one of the fixed feature of the safety valve or the movable feature of the safety valve and positioned proximate the one or more permanent magnets, the one or more magnetic field sensors configured to sense a movement of the movable feature to determine a health of the safety valve.

C. A method, the method including: 1) positioning a safety valve within a wellbore extending through one or more subterranean formations, the safety valve disposed in production tubing, the safety valve including: a) an outer housing; b) a bore flow management actuator disposed within the outer housing; c) a valve closure mechanism disposed within the outer housing, the bore flow management actuator configured to slide from a first initial state to a first subsequent state to move the valve closure mechanism between a first closed state and a first open state; d) one or more permanent magnets coupled to one of a movable feature of the safety valve or a fixed feature of the safety valve; and 3) one or more magnetic field sensors coupled to one of the fixed feature of the safety valve or the movable feature of the safety valve and positioned proximate the one or more permanent magnets, the one or more magnetic field sensors configured to sense a movement of the movable feature to determine a health of the safety valve; and 2) sensing a movement of the movable feature using the one or more permanent magnets and the one or more magnetic field sensors to determine a health of the safety valve.

D. A safety valve, the safety valve including: 1) an outer housing; 2) a bore flow management actuator disposed within the outer housing; 3) a valve closure mechanism disposed within the outer housing, the bore flow management actuator configured to slide from a first initial state to a first subsequent state to move the valve closure mechanism between a first closed state and a first open state; 4) one or more permanent magnets coupled to one of a movable feature of the safety valve or a fixed feature of the safety valve; and 5) one or more magnetic field angle sensors coupled to one of the fixed feature of the safety valve or the movable feature of the safety valve and positioned proximate the one or more permanent magnets, the one or more magnetic field angle sensors configured to sense a movement of the movable feature to determine a health of the safety valve.

E. A well system, the well system including: 1) a wellbore extending through one or more subterranean formations; b) production tubing disposed in the wellbore; and c) a safety valve disposed in the wellbore, the safety valve including: a) an outer housing; b) a bore flow management actuator disposed within the outer housing; c) a valve closure mechanism disposed within the outer housing, the bore flow management actuator configured to slide from a first initial state to a first subsequent state to move the valve closure mechanism between a first closed state and a first open state; d) one or more permanent magnets coupled to one of a movable feature of the safety valve or a fixed feature of the safety valve; and 3) one or more magnetic field angle sensors coupled to one of the fixed feature of the safety valve or the movable feature of the safety valve and positioned proximate the one or more permanent magnets, the one or more magnetic field angle sensors configured to sense a movement of the movable feature to determine a health of the safety valve.

F. A method, the method including: 1) positioning a safety valve within a wellbore extending through one or more subterranean formations, the safety valve disposed in production tubing, the safety valve including: a) an outer housing; b) a bore flow management actuator disposed within the outer housing; c) a valve closure mechanism disposed within the outer housing, the bore flow management actuator configured to slide from a first initial state to a first subsequent state to move the valve closure mechanism between a first closed state and a first open state; d) one or more permanent magnets coupled to one of a movable feature of the safety valve or a fixed feature of the safety valve; and 3) one or more magnetic field angle sensors coupled to one of the fixed feature of the safety valve or the movable feature of the safety valve and positioned proximate the one or more permanent magnets, the one or more magnetic field angle sensors configured to sense a movement of the movable feature to determine a health of the safety valve; and 2) sensing a movement of the movable feature using the one or more permanent magnets and the one or more magnetic field angle sensors to determine a health of the safety valve.

G. An inflow control valve (ICV), the inflow control valve (ICV) including: 1) a valve body; 2) a fluid flow path defined within the valve body, the fluid flow path including a channel positioned between an inlet fluid port and an outlet fluid port; 3) a movable feature disposed along the fluid flow path between the inlet fluid port and the outlet fluid port, the movable feature configured to form a restriction in the channel to control fluid flow along the fluid flow path; 4) one or more permanent magnets coupled to one of the movable feature or a fixed feature of the valve body; and 5) one or more magnetic field sensors coupled to one of the fixed feature or the movable feature and positioned proximate the one or more permanent magnets, the one or more magnetic field sensors configured to sense a movement of the movable feature to determine a health of the inflow control valve (ICV).

H. A lower completion, the lower completion including: 1) a base pipe extending between a first end and a second end and defining an interior flow passage; 2) one or more openings extending through a sidewall thickness of the base pipe; and 3) an inflow control valve (ICV) coupled to the base pipe proximate the one or more openings, the inflow control valve (ICV) including: a) a valve body; b) a fluid flow path defined within the valve body, the fluid flow path including a channel positioned between an inlet fluid port and an outlet fluid port; c) a movable feature disposed along the fluid flow path between the inlet fluid port and the outlet fluid port, the movable feature configured to form a restriction in the channel to control fluid flow along the fluid flow path; d) one or more permanent magnets coupled to one of the movable feature or a fixed feature of the valve body; and e) one or more magnetic field sensors coupled to one of the fixed feature or the movable feature and positioned proximate the one or more permanent magnets, the one or more magnetic field sensors configured to sense a movement of the movable feature to determine a health of the inflow control valve (ICV).

I. A well system, the well system including: 1) a wellbore extending through one or more subterranean formations; and 2) a lower completion coupled to a conduit and positioned within the wellbore, the lower completion including: a) a base pipe extending between a first end and a second end and defining an interior flow passage; b) one or more openings extending through a sidewall thickness of the base pipe; and c) an inflow control valve (ICV) coupled to the base pipe proximate the one or more openings, the inflow control valve (ICV) including: i) a valve body; ii) a fluid flow path defined within the valve body, the fluid flow path including a channel positioned between an inlet fluid port and an outlet fluid port; iii) a movable feature disposed along the fluid flow path between the inlet fluid port and the outlet fluid port, the movable feature configured to form a restriction in the channel to control fluid flow along the fluid flow path; iv) one or more permanent magnets coupled to one of the movable feature or a fixed feature of the valve body; and v) one or more magnetic field sensors coupled to one of the fixed feature or the movable feature and positioned proximate the one or more permanent magnets, the one or more magnetic field sensors configured to sense a movement of the movable feature to determine a health of the inflow control valve (ICV).

Aspects A, B, C, D, E, F, G, H and I may have one or more of the following additional elements in combination: Element 1: wherein the movable feature is at least a portion of the bore flow management actuator. Element 2: wherein the bore flow management actuator includes a flow tube main body configured to move the valve closure mechanism between the first closed state and the first open state, and further wherein the movable feature is the flow tube main body. Element 3: wherein the movable feature is the valve closure mechanism. Element 4: wherein the valve closure mechanism is a flapper valve. Element 5: wherein the valve closure mechanism is a ball valve. Element 6: wherein the one or magnetic field sensors are configured to sense a velocity of movement of the movable feature to determine the health of the safety valve. Element 7: wherein the one or magnetic field sensors are configured to sense an acceleration versus time of movement of the movable feature to determine the health of the safety valve. Element 8: wherein the one or more permanent magnets are coupled to one of the movable feature of the safety valve or the fixed feature of the safety valve and the one or more magnetic field sensors coupled to an other of the fixed feature of the safety valve of the movable feature of the safety valve. Element 9: wherein the one or more permanent magnets are coupled to the movable feature and the one or more magnetic field sensors are coupled to the fixed feature. Element 10: wherein the movable feature is at least a portion of the bore flow management actuator. Element 11: wherein the bore flow management actuator includes a flow tube main body configured to move the valve closure mechanism between the first closed state and the first open state, and further wherein the movable feature is the flow tube main body. Element 12: wherein the movable feature is the valve closure mechanism. Element 13: wherein the valve closure mechanism is a flapper valve. Element 14: wherein the valve closure mechanism is a ball valve. Element 15: wherein the one or more magnetic field angle sensors are configured to sense a velocity of movement of the movable feature to determine the health of the safety valve. Element 16: wherein the one or more magnetic field angle sensors are configured to sense an acceleration versus time of movement of the movable feature to determine the health of the safety valve. Element 17: wherein the one or more permanent magnets are coupled to one of the movable feature of the safety valve or the fixed feature of the safety valve and the one or more magnetic field angle sensors coupled to an other of the fixed feature of the safety valve of the movable feature of the safety valve. Element 18: wherein the one or more permanent magnets are coupled to the movable feature and the one or more magnetic field angle sensors are coupled to the fixed feature. Element 19: wherein the one or more magnetic field angle sensors are two or more proximately positioned magnetic field angle sensors. Element 20: wherein the movable feature is an adjustable valve. Element 21: wherein the adjustable valve is a sliding feature. Element 22: wherein the sliding feature is a plunger valve. Element 23: wherein the adjustable valve is a ball valve. Element 24: wherein the adjustable valve is a flapper valve. Element 25: wherein the one or more magnetic field sensors are configured to measure a magnitude of an electric field to determine the health of the inflow control valve (ICV). Element 26: wherein the one or more magnetic field sensors are configured to measure an angle of an electric field to determine the health of the inflow control valve (ICV). Element 27: wherein the one or more magnetic field sensors are coupled to the fixed feature. Element 28: wherein the one or more permanent magnets are coupled to the movable feature.

Those skilled in the art to which this application relates will appreciate that other and further additions, deletions, substitutions and modifications may be made to the described embodiments.

What is claimed is:

1. A safety valve, comprising:

an outer housing;

a bore flow management actuator disposed within the outer housing;

a valve closure mechanism disposed within the outer housing, the bore flow management actuator configured to slide from a first initial state to a first subsequent state to move the valve closure mechanism between a first closed state and a first open state;

one or more permanent magnets coupled to one of a movable feature of the safety valve or a fixed feature of the safety valve; and one or more magnetic field angle sensors coupled to one of the fixed feature of the safety valve or the movable feature of the safety valve and positioned proximate the one or more permanent magnets, the one or more magnetic field angle sensors configured to sense a movement of the one or more permanent magnets based upon a change of angle between the one or more permanent magnets and the one or more magnetic field angle sensors to determine a moving of the movable feature to determine a health of the safety valve.

2. The safety valve as recited in claim 1, wherein the movable feature is at least a portion of the bore flow management actuator.

3. The safety valve as recited in claim 2, wherein the bore flow management actuator includes a flow tube main body configured to move the valve closure mechanism between the first closed state and the first open state, and further wherein the movable feature is the flow tube main body.

4. The safety valve as recited in claim 1, wherein the movable feature is the valve closure mechanism.

5. The safety valve as recited in claim 4, wherein the valve closure mechanism is a flapper valve.

6. The safety valve as recited in claim 4, wherein the valve closure mechanism is a ball valve.

7. The safety valve as recited in claim 1, wherein the one or more magnetic field angle sensors are configured to sense a velocity of movement of the movable feature to determine the health of the safety valve.

8. The safety valve as recited in claim 1, wherein the one or more magnetic field angle sensors are configured to sense an acceleration versus time of movement of the movable feature to determine the health of the safety valve.

9. The safety valve as recited in claim 1, wherein the one or more permanent magnets are coupled to one of the movable feature of the safety valve or the fixed feature of the safety valve and the one or more magnetic field angle sensors coupled to an other of the fixed feature of the safety valve of the movable feature of the safety valve.

10. The safety valve as recited in claim 9, wherein the one or more permanent magnets are coupled to the movable feature and the one or more magnetic field angle sensors are coupled to the fixed feature.

11. The safety valve as recited in claim 1, wherein the one or more magnetic field angle sensors are two or more proximately positioned magnetic field angle sensors.

12. The safety valve as recited in claim 1, wherein the one or more magnetic field angle sensors comprise angle-based sensors selected from the group consisting of giant magnetoresistance (GMR), tunnel magnetoresistance (TMR), and anisotropic magnetoresistance (AMR) sensors.

13. A well system, comprising:

a wellbore extending through one or more subterranean formations;

production tubing disposed in the wellbore; and a safety valve disposed in the wellbore, the safety valve including:

an outer housing;

a bore flow management actuator disposed within the outer housing;

a valve closure mechanism disposed within the outer housing, the bore flow management actuator configured to slide from a first initial state to a first subsequent state to move the valve closure mechanism between a first closed state and a first open state;

one or more permanent magnets coupled to one of a movable feature of the safety valve or a fixed feature of the safety valve; and one or more magnetic field angle sensors coupled to one of the fixed feature of the safety valve or the movable feature of the safety valve and positioned proximate the one or more permanent magnets, the one or more magnetic field angle sensors configured to sense a movement of the one or more permanent magnets based upon a change of angle between the one or more permanent magnets and the one or more magnetic field angle sensors to determine a moving of the movable feature to determine a health of the safety valve.

14. The well system as recited in claim 13, wherein the movable feature is at least a portion of the bore flow management actuator.

15. The well system as recited in claim 14, wherein the bore flow management actuator includes a flow tube main body configured to move the valve closure mechanism between the first closed state and the first open state, and further wherein the movable feature is the flow tube main body.

16. The well system as recited in claim 13, wherein the movable feature is the valve closure mechanism.

17. The well system as recited in claim 16, wherein the valve closure mechanism is a flapper valve.

18. The well system as recited in claim 16, wherein the valve closure mechanism is a ball valve.

19. The well system as recited in claim 13, wherein the one or more magnetic field angle sensors are configured to sense a velocity of movement of the movable feature to determine the health of the safety valve.

20. The well system as recited in claim 13, wherein the one or more magnetic field angle sensors are configured to sense an acceleration versus time of movement of the movable feature to determine the health of the safety valve.

21. The well system as recited in claim 13, wherein the one or more permanent magnets are coupled to one of the movable feature of the safety valve or the fixed feature of the safety valve and the one or more magnetic field angle sensors coupled to an other of the fixed feature of the safety valve of the movable feature of the safety valve.

22. The well system as recited in claim 21, wherein the one or more permanent magnets are coupled to the movable feature and the one or more magnetic field angle sensors are coupled to the fixed feature.

23. The well system as recited in claim 13, wherein the one or more magnetic field angle sensors are two or more proximately positioned magnetic field angle sensors.

24. A method, comprising:

positioning a safety valve within a wellbore extending through one or more subterranean formations, the safety valve disposed in production tubing, the safety valve including:

an outer housing;

a bore flow management actuator disposed within the outer housing;

a valve closure mechanism disposed within the outer housing, the bore flow management actuator configured to slide from a first initial state to a first subsequent state to move the valve closure mechanism between a first closed state and a first open state;

one or more permanent magnets coupled to one of a movable feature of the safety valve or a fixed feature of the safety valve; and one or more magnetic field angle sensors coupled to one of the fixed feature of the safety valve or the movable feature of the safety valve and positioned proximate the one or more permanent magnets, the one or more magnetic field angle sensors configured to sense a movement of the one or more permanent magnets based upon a change of angle between the one or more permanent magnets and the one or more magnetic field angle sensors to determine a moving of the movable feature to determine a health of the safety valve; and sensing a movement of the movable feature using the one or more permanent magnets and the one or more magnetic field angle sensors to determine a health of the safety valve.

* * * * *